(12) United States Patent
Jiang et al.

(10) Patent No.: US 11,064,391 B2
(45) Date of Patent: *Jul. 13, 2021

(54) REMOTE CHANNEL SELECTION

(71) Applicant: AT&T Intellectual Property I, L.P., Atlanta, GA (US)

(72) Inventors: Baofeng Jiang, Pleasanton, CA (US); Rodney McTaggart, Terrell, TX (US); Sangho Oh, San Ramon, CA (US); Yuhong Zheng, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/984,496

(22) Filed: May 21, 2018

(65) Prior Publication Data

US 2018/0279178 A1  Sep. 27, 2018

Related U.S. Application Data

(63) Continuation of application No. 14/806,703, filed on Jul. 23, 2015, now Pat. No. 10,009,795.

(51) Int. Cl.
| | |
|---|---|
| *H04W 28/16* | (2009.01) |
| *H04W 24/08* | (2009.01) |
| *H04W 28/08* | (2009.01) |
| *H04W 72/04* | (2009.01) |
| *H04W 84/12* | (2009.01) |
| *H04W 72/12* | (2009.01) |
| *H04W 24/02* | (2009.01) |

(52) U.S. Cl.
CPC ........... *H04W 28/16* (2013.01); *H04W 24/08* (2013.01); *H04W 28/085* (2013.01); *H04W 24/02* (2013.01); *H04W 72/0486* (2013.01); *H04W 72/1231* (2013.01); *H04W 84/12* (2013.01)

(58) Field of Classification Search
CPC ... H04W 28/16; H04W 24/08; H04W 28/085; H04W 72/1231; H04W 24/02; H04W 84/12; H04W 72/0486
See application file for complete search history.

(56) References Cited

U.S. PATENT DOCUMENTS

| | | |
|---|---|---|
| 8,115,593 B2 | 2/2012 | Broad et al. |
| 8,811,349 B2 | 8/2014 | Deshpande et al. |
| 8,942,128 B2 | 1/2015 | Gusavac et al. |
| 8,996,665 B2 | 3/2015 | Baum et al. |
| 2007/0025310 A1 | 2/2007 | Weng |
| 2012/0165059 A1 | 6/2012 | Schmidt |

(Continued)

OTHER PUBLICATIONS

Dicioccio, Lucas et al., "Measuring Home Networks with HomeNet Profiler." *Passive and Active Measurement.* Springer Berlin Heidelberg, 2013.

*Primary Examiner* — Yaotang Wang
(74) *Attorney, Agent, or Firm* — Guntin & Gust, PLC; Robert Gingher

(57) ABSTRACT

A web-based radio survey service is provided to client devices. The client devices individually conduct a radio survey. The radio surveys are sent to a central server for analysis. The central server evaluates the radio surveys and determines a least congested radio channel for common use by all the client devices. The client devices may thus all switch to the least congested radio channel to ensure reliable radio service with an access device.

20 Claims, 25 Drawing Sheets

(56) References Cited

U.S. PATENT DOCUMENTS

| | | |
|---|---|---|
| 2014/0024406 A1* | 1/2014 | Lancaster ............. H04W 16/14 |
| | | 455/513 |
| 2014/0105003 A1 | 4/2014 | Austin et al. |
| 2014/0199968 A1 | 7/2014 | Canpolat et al. |
| 2014/0204924 A1 | 7/2014 | Ryu |
| 2014/0278781 A1 | 9/2014 | Liu |
| 2014/0282967 A1 | 9/2014 | Maguire et al. |
| 2014/0313890 A1* | 10/2014 | Shrote ............... H04W 72/1231 |
| | | 370/230 |
| 2014/0321300 A1 | 10/2014 | Yoon |
| 2015/0036662 A1* | 2/2015 | Chen .................... H04W 48/20 |
| | | 370/332 |
| 2015/0043377 A1 | 2/2015 | Cholas et al. |
| 2015/0103685 A1* | 4/2015 | Butchko ............... H04L 41/147 |
| | | 370/252 |

* cited by examiner

FIG. 19

| Survey Source | SSID | BSSID | Channel | RSSI | Timestamp (GMT) |
|---|---|---|---|---|---|
| Outside Entry Camera | ATT-66F | F4:5F:D4:79:A3:3F | 11 | -69 | 08/13/2014 14:39:38 |
| | ATT-18A | 38:6B:BB:31:4F:B0 | 2 | -75 | 08/13/2014 14:39:38 |
| | DIR-ROKU | B0:A7:37:1D:EC:19 | 1 | -72 | 08/13/2014 14:39:38 |
| | ATT-30K | 94:C1:50:06:BE:36 | 1 | -53 | 08/13/2014 14:39:38 |
| Survey Source | SSID | BSSID | Channel | RSSI | Timestamp (GMT) |
| Living Room Camera | ATT-66F | F4:5F:D4:79:A3:3F | 11 | -75 | 08/13/2014 14:39:18 |
| | Terrell-Access | 00:40:96:53:71:0F | 11 | -67 | 08/13/2014 14:39:18 |
| | ATT-30K | 94:C1:50:06:BE:36 | 1 | -59 | 08/13/2014 14:39:18 |
| | 2WIRE367 | A0:B7:90:88:32:3F | 6 | -63 | 08/13/2014 14:39:18 |
| | Gateway03 | F4:5F:D4:03:55:A3 | 11 | -50 | 08/13/2014 14:39:03 |
| Survey Source | SSID | BSSID | Channel | RSSI | Timestamp (GMT) |
| Digital Life MCP | ATT-66F | F4:5F:D4:79:A3:3F | 11 | -55 | 08/13/2014 14:39:03 |
| | Terrell-Access | 00:40:96:53:71:0F | 11 | -77 | 08/13/2014 14:39:03 |
| | ATT-704 | 14:5B:D1:06:BE:36 | 1 | -60 | 08/13/2014 14:39:03 |
| | 2WIRE367 | A0:B7:90:88:32:3F | 6 | -71 | 08/13/2014 14:39:03 |

FIG. 20

| Survey Source | SSID | BSSID | Channel | RSSI | Timestamp (GMT) |
|---|---|---|---|---|---|
| Outside Entry Camera | ATT-866 | F4:5E:D4:79:A3:1F | 11 | -60 | 08/13/2014 14:39:38 |
| | ATT-18A | 38:6B:BB:31:4F:B0 | 2 | -75 | 08/13/2014 14:39:38 |
| | DIR-ROKU | B0:A7:37:1D:EC:19 | 1 | -72 | 08/13/2014 14:39:38 |
| | ATT-30K | 94:C1:50:06:BE:36 | 1 | -53 | 08/13/2014 14:39:38 |
| Survey Source | SSID | BSSID | Channel | RSSI | Timestamp (GMT) |
| Living Room Camera | ATT-866 | F4:5E:D4:79:A3:1F | 11 | -75 | 08/13/2014 14:39:18 |
| | Terrell-Access | 00:40:96:53:71:0F | 11 | -67 | 08/13/2014 14:39:18 |
| | ATT-30K | 94:C1:50:06:BE:36 | 4 | -59 | 08/13/2014 14:39:18 |
| | 2WIRE367 | A0:B7:90:88:32:3F | 6 | -63 | 08/13/2014 14:39:18 |
| | Gateway03 | F4:5F:D4:03:55:A3 | 11 | -50 | 08/13/2014 14:39:18 |
| Survey Source | SSID | BSSID | Channel | RSSI | Timestamp (GMT) |
| Digital Life MCP | ATT-866 | F4:5E:D4:79:A3:1F | 11 | -55 | 08/13/2014 14:39:03 |
| | Terrell-Access | 00:40:96:53:71:0F | 11 | -77 | 08/13/2014 14:39:03 |
| | ATT-704 | 14:5B:D1:06:BE:36 | 1 | -60 | 08/13/2014 14:39:03 |
| | 2WIRE367 | A0:B7:90:88:32:3F | 6 | -71 | 08/13/2014 14:39:03 |

200    182    184    52    186    202

REMOTE CHANNEL SELECTION

CROSS-REFERENCE TO RELATED APPLICATION

This application is a continuation of U.S. application Ser. No. 14/806,703 filed Jul. 23, 2015 and since issued as U.S. Pat. No. 10,009,795, and incorporated herein by reference in its entirety.

BACKGROUND

Radio congestion is a problem. As more homes and businesses implement local wireless area networks, neighbors are interfering with each other. For example, neighboring WI-FI® networks may use the same radio channel, thus creating radio congestion. Performance suffers and users are disappointed.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 19-22 are illustrations of the data package 100, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
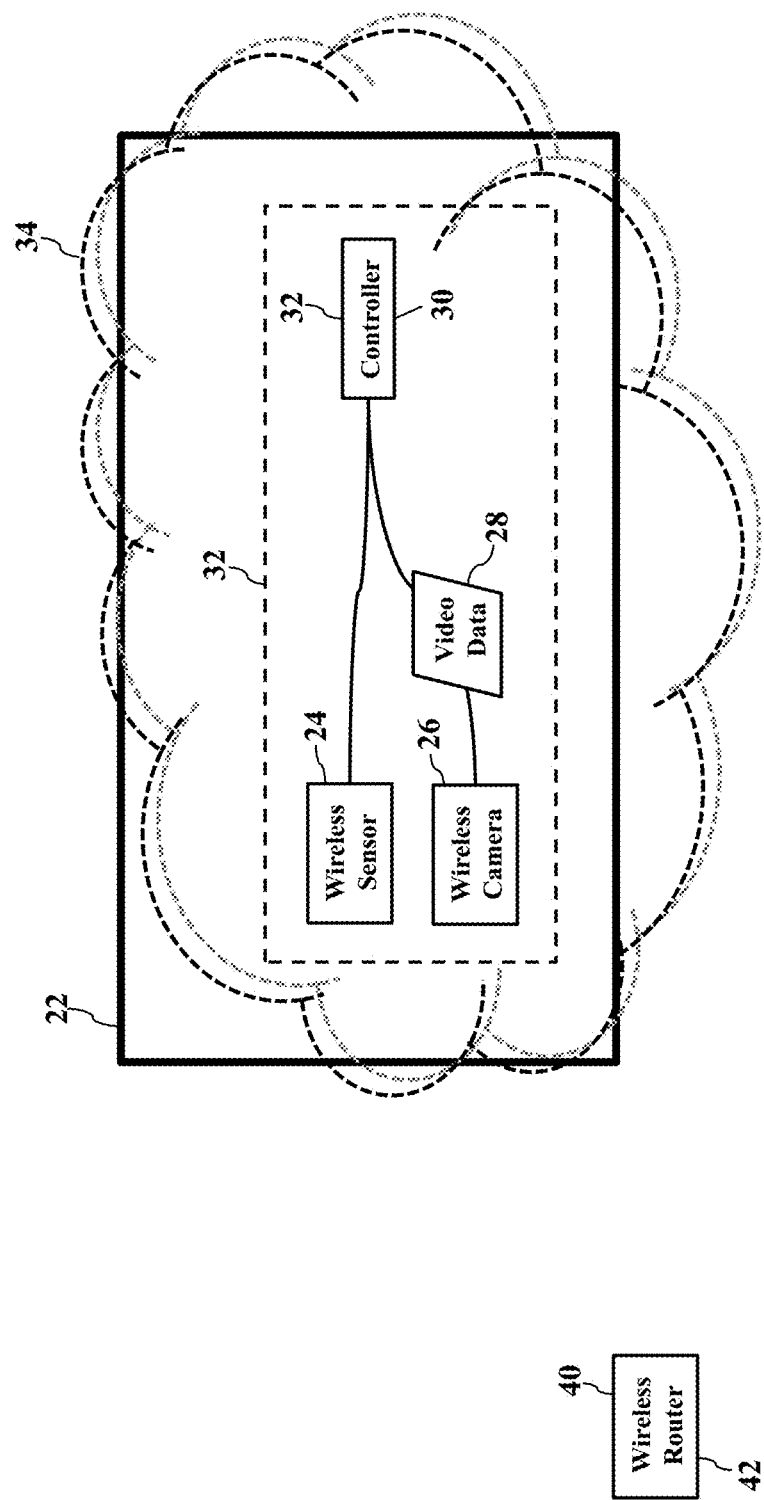
FIGS. 1-7 are simplified schematics illustrating an environment in which exemplary embodiments may be implemented.

FIGS. 1-7 are simplified illustrations of an operating environment, according to exemplary embodiments. While exemplary embodiments may be implemented in many environments, FIG. 1 illustrates a common operating environment that most readers will understand. A security system 20 is installed in a building 22, such as a home or business. The security system 20 may have many wireless sensors 24 that protect occupants from fire, intrusion, and other security conditions. For example, a wireless camera 26 captures video data 28 of an entry door or other location in the building 22. The security system 20 may have other wireless sensors 24, such as motion detectors, carbon monoxide and fire sensors, water sensors, and many other wireless devices. All the wireless sensors 24 send their respective sensory data to a security controller 30 of the security system 20. The controller 30 may have wireless capabilities, thus acting as an access point 32 to a wireless network 34. The controller 30, in other words, may be a wireless base station for the wireless sensors 24 in the security system 20. The wireless sensors 24 may thus wirelessly send their respective sensory data to the controller 30 for analysis. If the controller 30 determines a security event or alarm, the controller 30 sends electronic notification messages, as is known.

Figure 2:
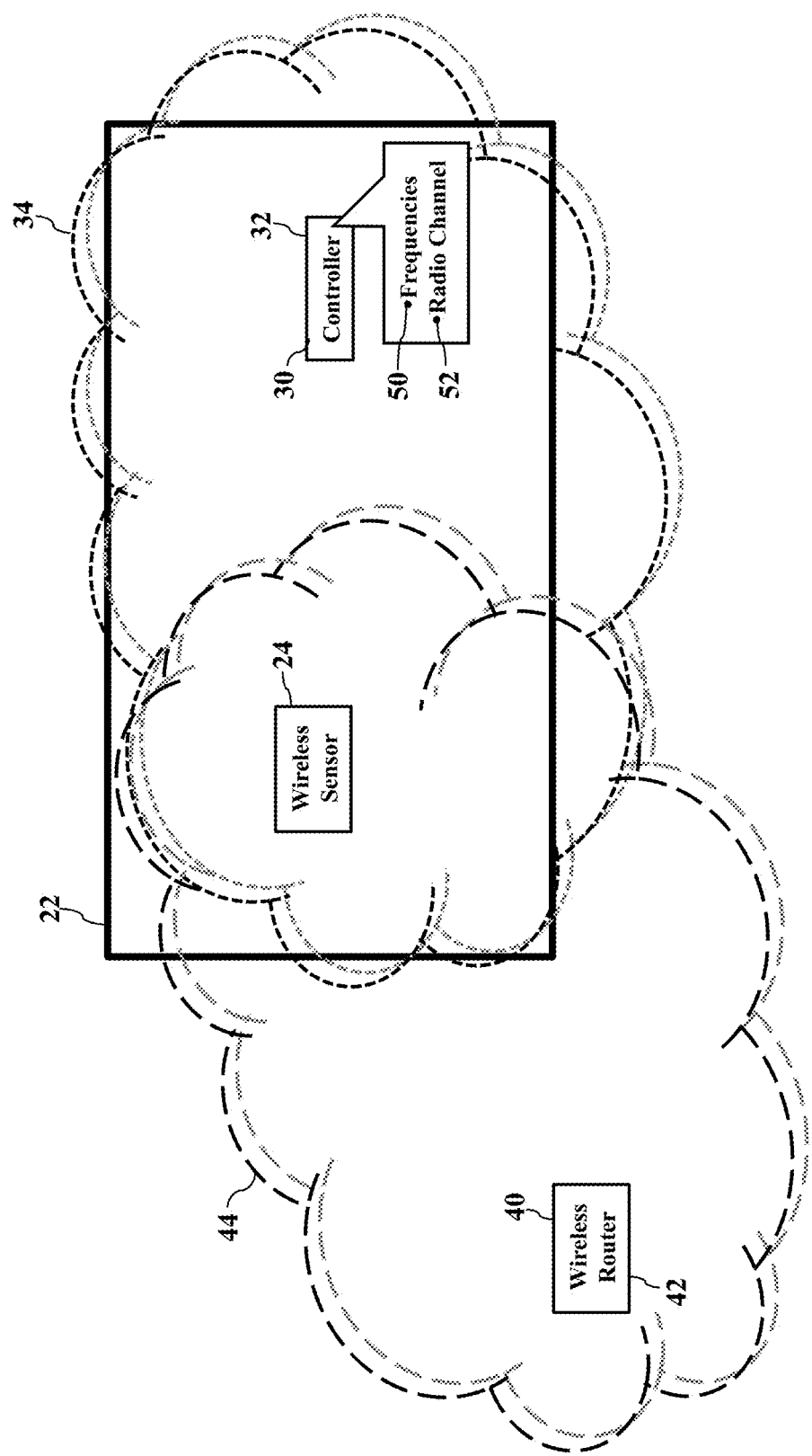

FIGS. 1 and 2 also illustrate neighboring network componentry. As the reader may understand, neighboring homes, apartments, restaurants, and other businesses may also have their own wireless networking components. For example, a neighbor installs a neighboring wireless router 40. As FIG. 2 best illustrates, the neighbor's wireless router 40 broadcasts signals, thus acting as a neighboring access point 42 to a neighboring network 44. Coverage areas may overlap; meaning some of the wireless sensors 24 in the security system 20 may also detect the neighboring network 44. That is, the wireless sensor 24 can detect both the wireless network 34 (established by the controller 30) and the neighboring network 44 (created by the neighbor's wireless router 40). Experience has thus shown that the controller 30 of the security system 20 may inadvertently select frequencies 50 for the wireless network 34 that overlap the same frequencies 50 used by the neighboring network 44. In simple words, the wireless network 34 and the neighboring network 44 may inadvertently use the same radio channel 52. The wireless sensor 24 may thus have difficulty communicating with the controller 30, which compromises operation of the security system 20.

Figure 3:
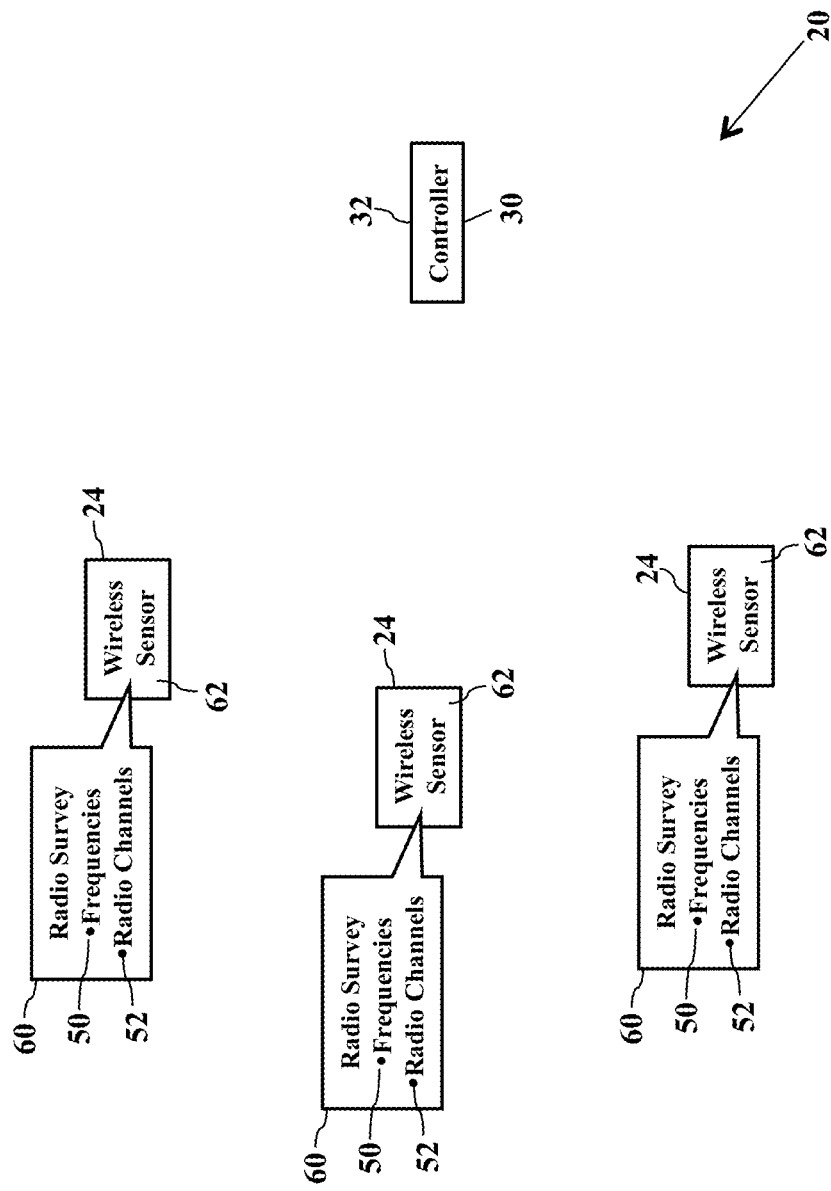

FIG. 3, though, illustrates a solution. Here any of the wireless sensors 24 of the security system 20 may conduct a radio survey 60. Each of the wireless sensors 24 may have a transceiver 62 that receives wireless signals. The transceiver 62 may also send wireless signals. While exemplary embodiments may be applied to any frequencies in the electromagnetic spectrum, this disclosure will mainly discuss the frequencies reserved for the IEEE 802.11 family of protocols for wireless local area networks. For example, portions of the IEEE 802.11 family of protocols provide the ubiquitous wireless local area network (or "WI-FI®") service used by smartphones. This disclosure will thus be explained using WI-FI® concepts and terminology familiar to most readers. Each of the wireless sensors 24 may thus scan the frequencies 50 and/or radio channels 52 that are reserved for WI-FI® usage. The controller 30 of the security system 20 may also conduct the radio survey 60.

Figure 4:
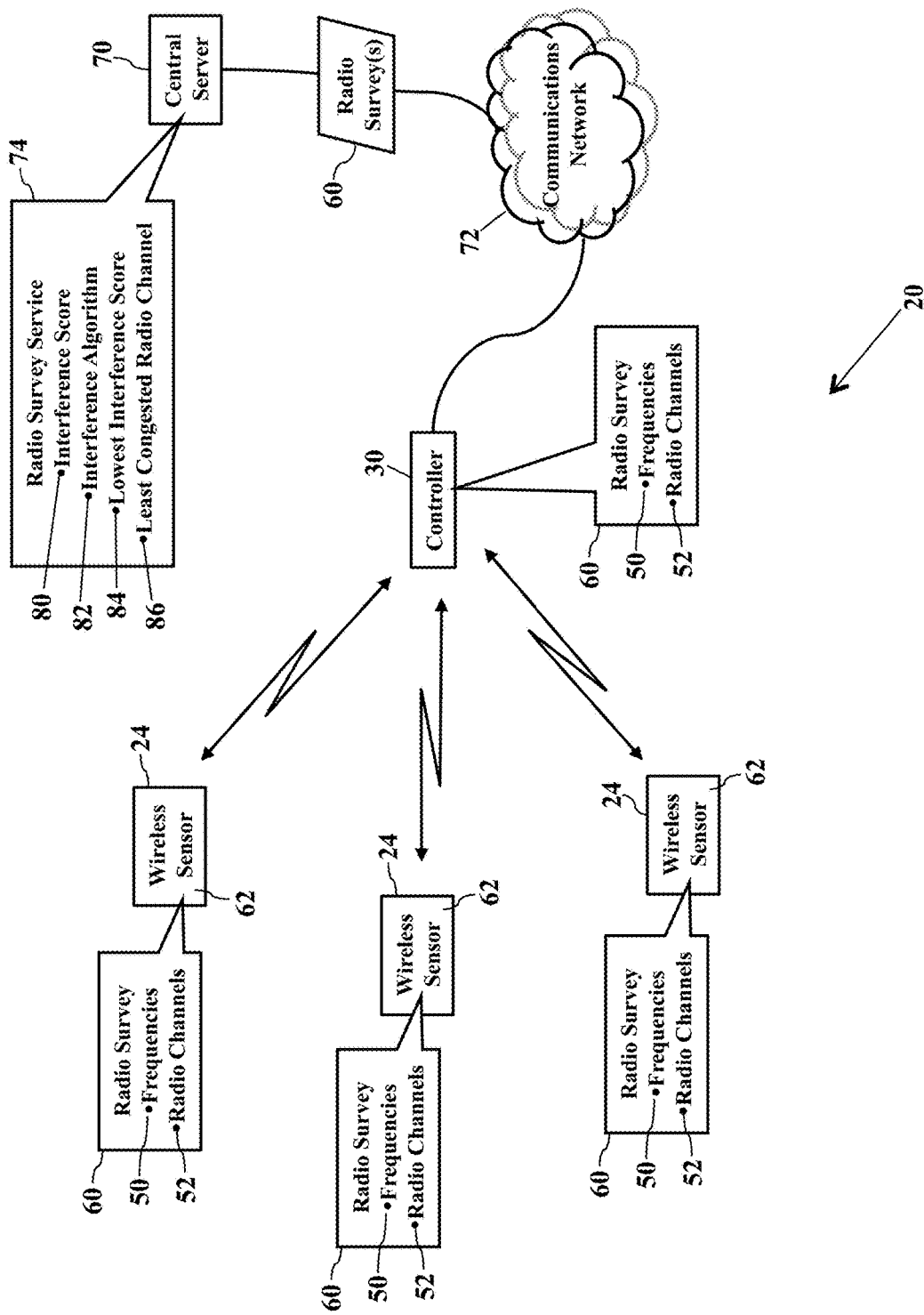

FIG. 4 illustrates remote service processing. When each wireless sensor 24 completes the radio survey 60, the wireless sensor 24 sends its corresponding radio survey 60 to the controller 30. The controller 30 may then forward the radio surveys 60 to a central location for processing and analysis. FIG. 4, for example, illustrates a central server 70 that communicates via a communications network 72 (such as the "Internet") with the controller 30 of the security system 20. The central server 70 provides a web-based, or cloud-based, radio survey service 74 for clients. The central server 70 receives the radio surveys 60 from the wireless sensors 24 associated with the controller 30 of the security system 20. The controller 30 of the security system 20 may also conduct and send its own radio survey 60 to the central server 70. The central server 70 thus collects multiple real time radio surveys 60 from the multiple wireless sensors 24 at different geographical positions or locations served by the wireless network 34 (illustrated in FIGS. 1 & 2). The central server 70 analyzes all the real time radio surveys 60 associated with the wireless sensors 24 of the security system 20. The central server 70 then determines an interference score 80 associated with each one of the radio channels 52 reserved for WI-FI® service, perhaps on a per-sensor basis. The interference score 80 is determined by an interference algorithm 82, which later paragraphs will explain. The central server 70 compares the different interference scores 80 for each different radio channel 52, as determined from the radio survey 60 sent by each wireless sensor 24. The lowest interference score 84 is selected, which corresponds to a least congested radio channel 86 determined from all the radio surveys 60. The central server 70 thus provides the radio survey service 74 for the components of the security system 20.

Figure 5:
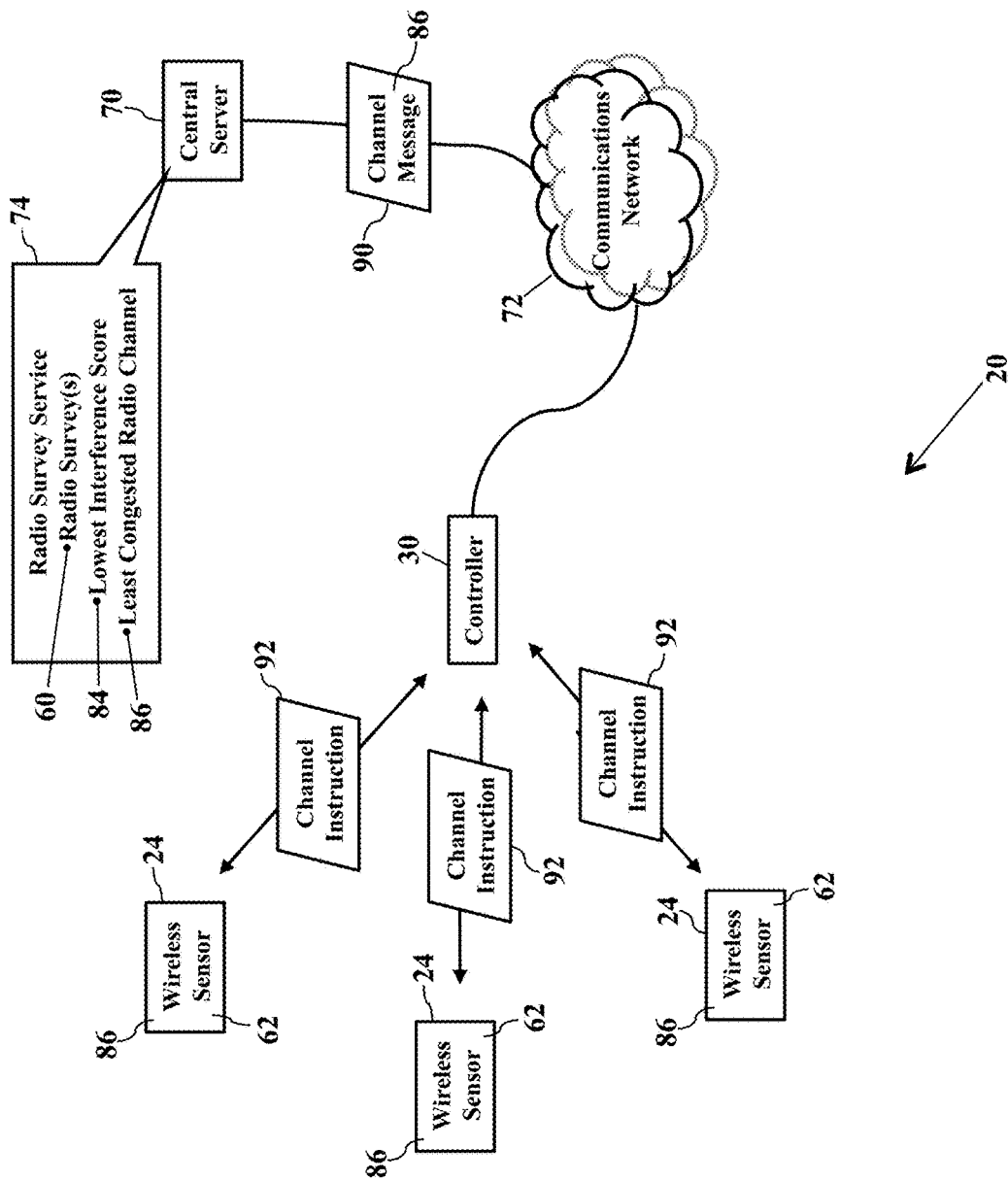

FIG. 5 illustrates resultant notifications. Once the central server 70 determines the least congested radio channel 86, the central server 70 informs the security system 20. For example, the central server 70 may send an electronic channel message 90 to the controller 30. The electronic channel message 90 contains or includes information or data describing the least congested radio channel 86, based on the radio surveys 60 previously sent. The controller 30 may then send or broadcast a WI-FI® channel instruction 92 to each one of the wireless sensors 24 associated with the security system 20. The WI-FI® channel instruction 92 instructs the transceiver 62 in each wireless sensor 24 to switch to the least congested radio channel 86.

Exemplary embodiments thus present an elegant solution. The central server 70 easily and quickly determines the least congested radio channel 86 over the Internet. Conventional radio surveys require specialized test equipment and specialized training. Exemplary embodiments, instead, provide the cloud-based radio survey service 74 for client devices. The cloud-based radio survey service 74 is request-based and performed in nearly real time. As exemplary embodiments may be web-based, no service or field technician need be dispatched. Exemplary embodiments may thus be performed for any home and business at any location, as long as data service is available. Exemplary embodiments thus present a much faster and cheaper survey result than conventional schemes.

Exemplary embodiments may be demand-based. As the reader may understand, radio congestion may be a dynamically changing situation. As wireless devices access wireless networks, channel usage may increase. At other times, though, wireless devices drop off, perhaps reducing channel usage. Exemplary embodiments, then, may be commanded at any time to conduct the radio surveys 60 to determine the least congested radio channel 86. Indeed, as most users crave "fast" wireless speeds, some users may be willing to pay fees for the radio survey service 74 performed by the central server 70. Some users, for example, may configure their security system 20 to periodically request the least congested radio channel 86 to ensure the best-possible wireless service. Exemplary embodiments may thus include a fee-based payment plan to ensure quality of service.

Figure 6:
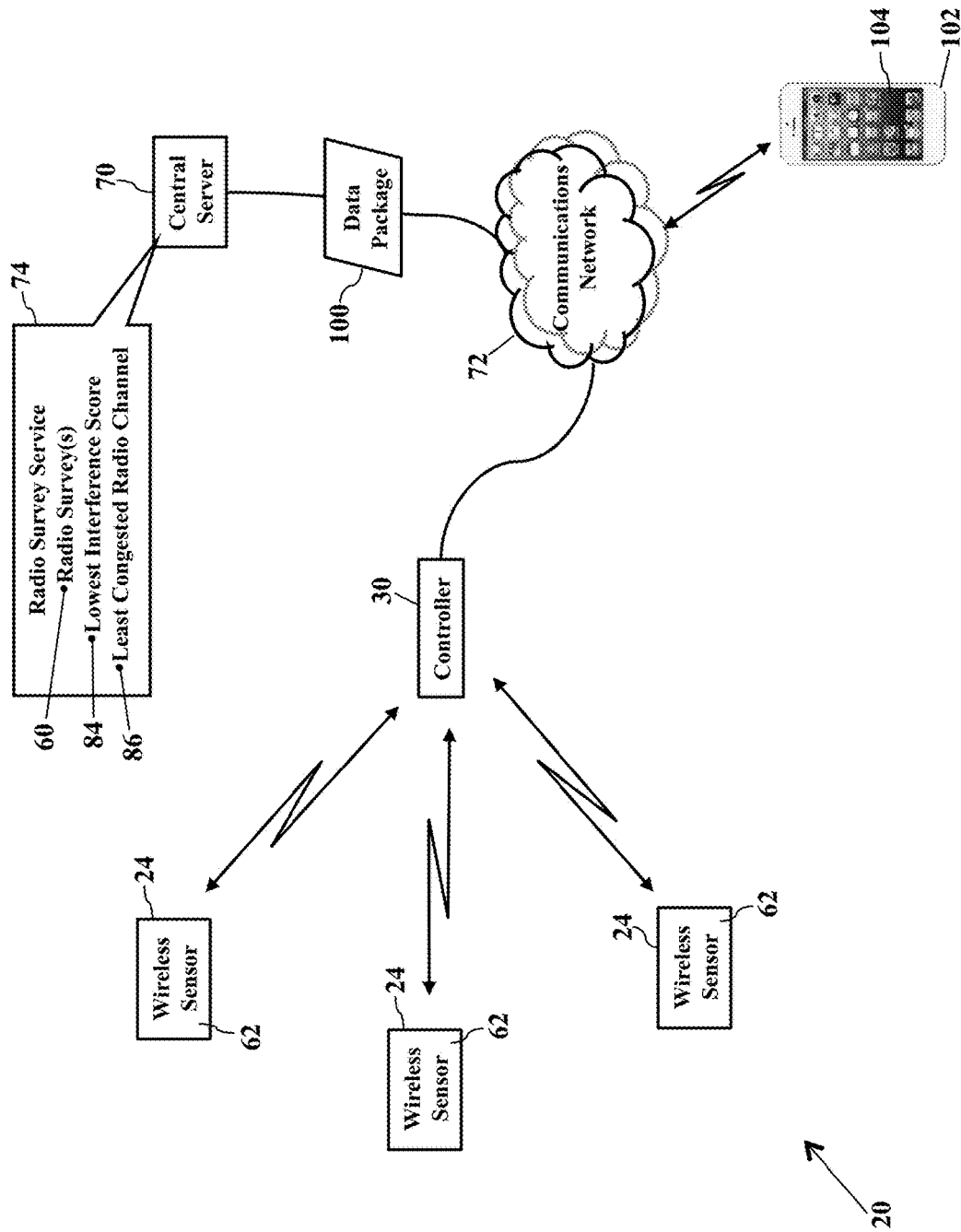

FIG. 6 illustrates a survey visualization. The interference score 80, determined by the interference algorithm 82, may be a complicated analysis. Most users, then, may be satisfied with the resultant least congested radio channel 86 without desiring the details. Other users, though, may desire the details of the radio surveys 60 analyzed by the interference algorithm 82. Exemplary embodiments may thus include a data package 100. The data package 100 may include details of the survey analysis, such as the raw data and each individual interference score 80. The central server 70 generates the data package 100, which may be sent to any network destination. FIG. 6, for example, illustrates the data package 100 routing to the network address associated with a mobile smartphone 102. The mobile smartphone 102 may be preregistered or preapproved for remote control of the security system 20. When the mobile smartphone 102 receives the data package 100, the mobile smartphone 102 may process the data package 100 for display on its display device 104. The data package 100 may thus be visualized with graphs, tables, text, and other graphical user interfaces.

Figure 7:
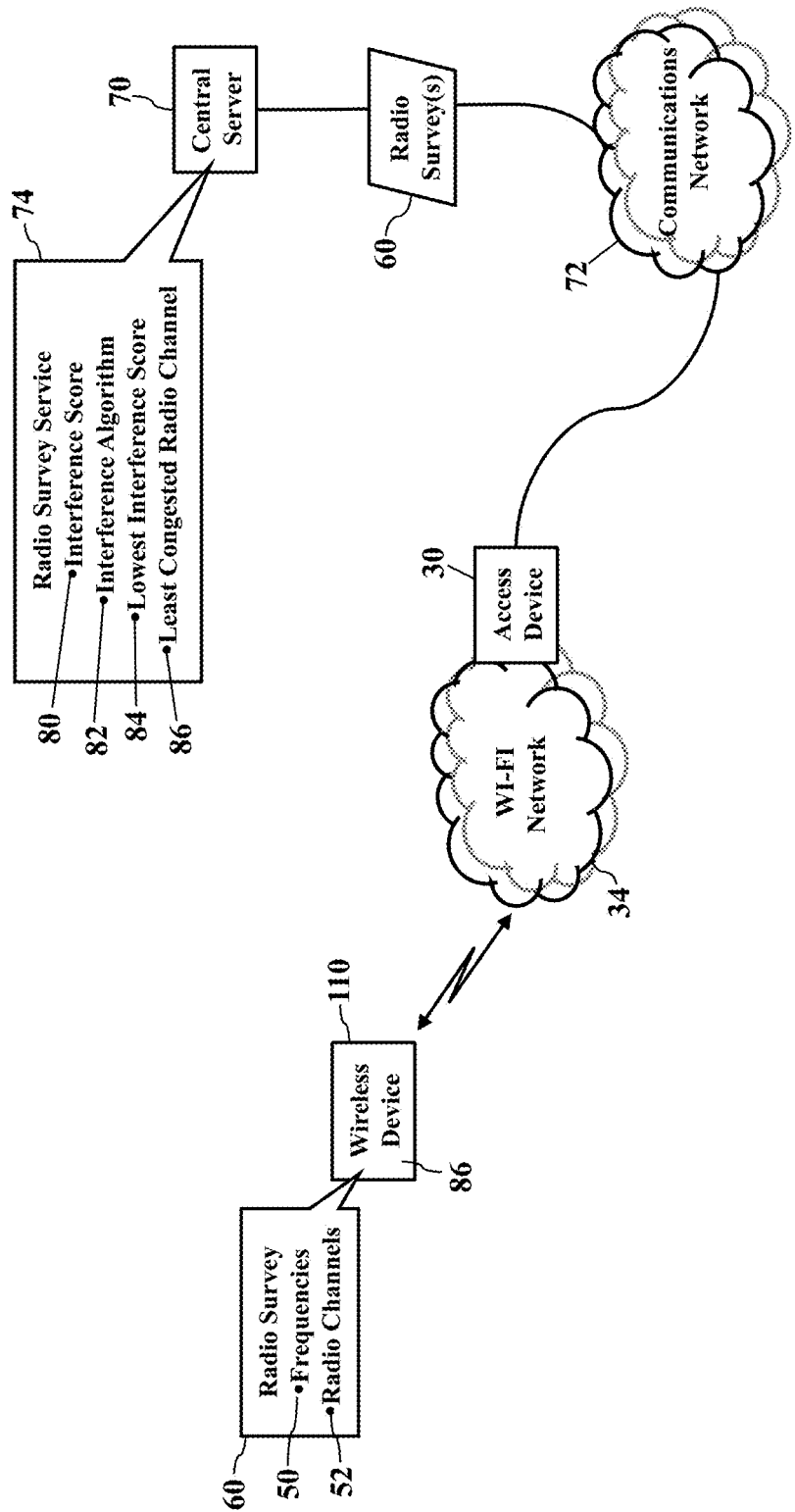

FIG. 7 illustrates a more generalized environment. Here exemplary embodiments may be applied to any wireless device 110 accessing any wireless network 34. Again, as the reader may understand, many homes and businesses have the access point 32 to the wireless local area network (or WI-FI®) network 34 serving many homes and businesses. As WI-FI® networks can be ubiquitous in neighborhoods, towns, and shopping areas, congestion and interference may be common concerns. Here, though, the access point 32 may poll any WI-FI® device 110 for its corresponding radio survey 60. The central server 70 may thus receive several or even many radio surveys 60 from different wireless devices 110 at different physical or geographical locations served by the WI-FI® network 34. The central server 70 determines the interference score 80 associated with each one of the radio channels 52 for each wireless device 110. The lowest interference score 84 is selected, which corresponds to the least congested radio channel 86 that is commonly available to all the computers, appliances, mobile devices, and other wireless devices 110 accessing the WI-FI® network 34. The central server 70 notifies the access point 32 of the least congested radio channel 86 (perhaps using the electronic channel message 90 illustrated in FIG. 5). The access point 32 then commands the wireless device 110 to implement the least congested radio channel 86 (perhaps using the channel instruction 92 illustrated in FIG. 5).

Figure 8:
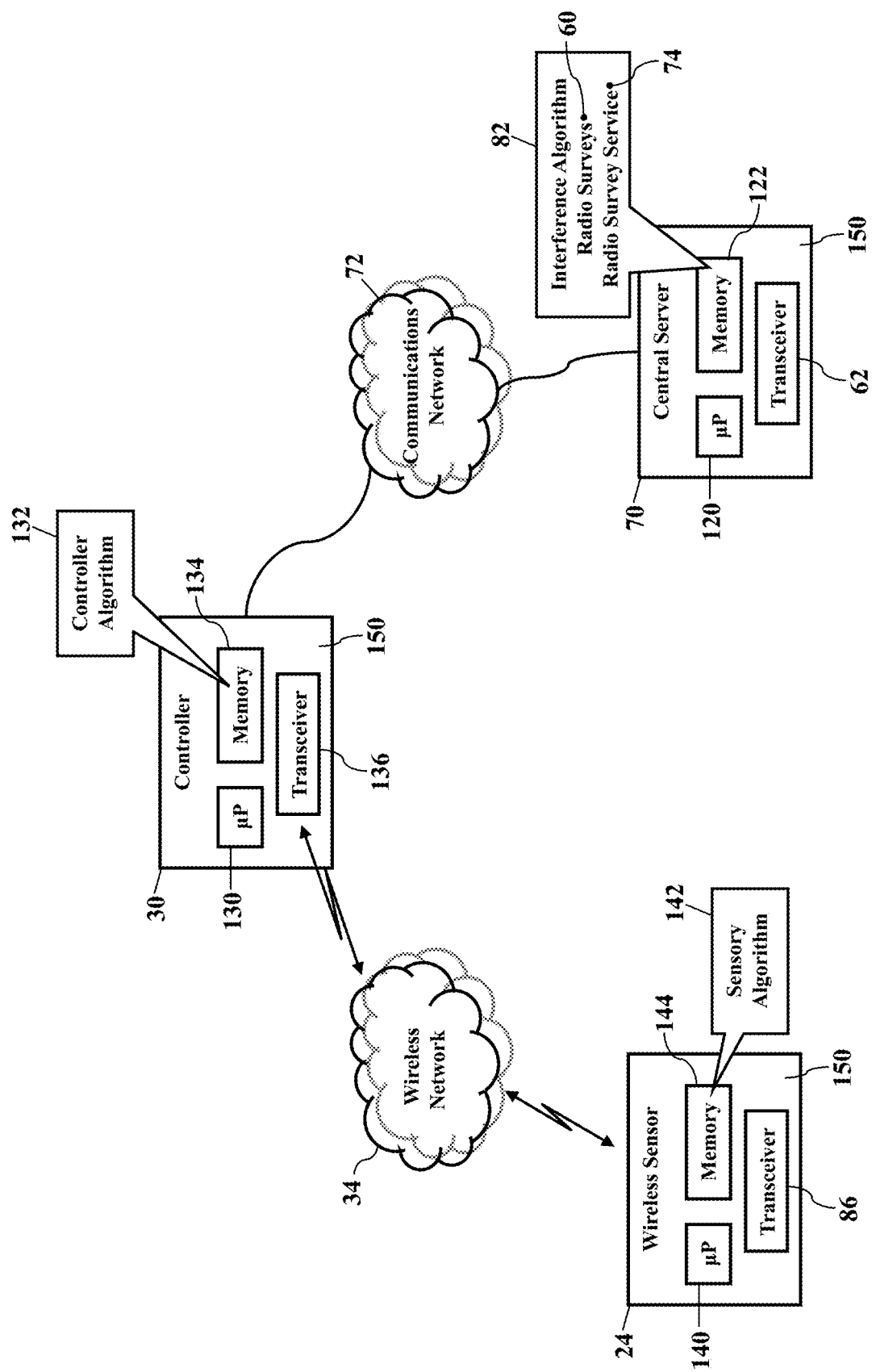
FIG. 8 is a more detailed illustration of the operating environment, according to exemplary embodiments.

FIG. 8 is a more detailed illustration of the operating environment, according to exemplary embodiments. The central server 70 communicates with the controller 30 via the communications network 72. The central server 70 has a processor 120 (e.g., "µP"), application specific integrated circuit (ASIC), or other component that executes the interference algorithm 82 stored in a memory device 122. The interference algorithm 82 instructs the processor 120 to perform operations, such as sending and receiving information via the communications network 72 and analyzing the radio surveys 60. The controller 30 may also have a processor 130 (e.g., "µP"), application specific integrated circuit (ASIC), or other component that executes a controller algorithm 132 stored in a memory device 134. The controller algorithm 132 instructs the processor 130 to perform operations, such as communicating with the central server 70, sending the radio surveys 60, and instructing its transceiver 136 to generate the wireless network 34. The wireless sensor 24 may also have a processor 140 (e.g., "µP"), application specific integrated circuit (ASIC), or other component that executes a sensory algorithm 142 stored in a memory device 144. The sensory algorithm 142 instructs the processor 140 to perform operations, such as communicating with the controller 30 and/or the central server 70, sending the radio surveys 60, and instructing its transceiver 86 to access the wireless network 34. The interference algorithm 82, the controller algorithm 132, and the sensory algorithm 142 may thus cooperate, perhaps in a client-server relationship, to provide the radio survey service 74.

Exemplary embodiments may packetize. The central server 70, the controller 30, and/or the wireless sensor 24 have one or more network interfaces 150 to the wireless network 34 and/or to the communications network 72. The network interface 150 may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 9:
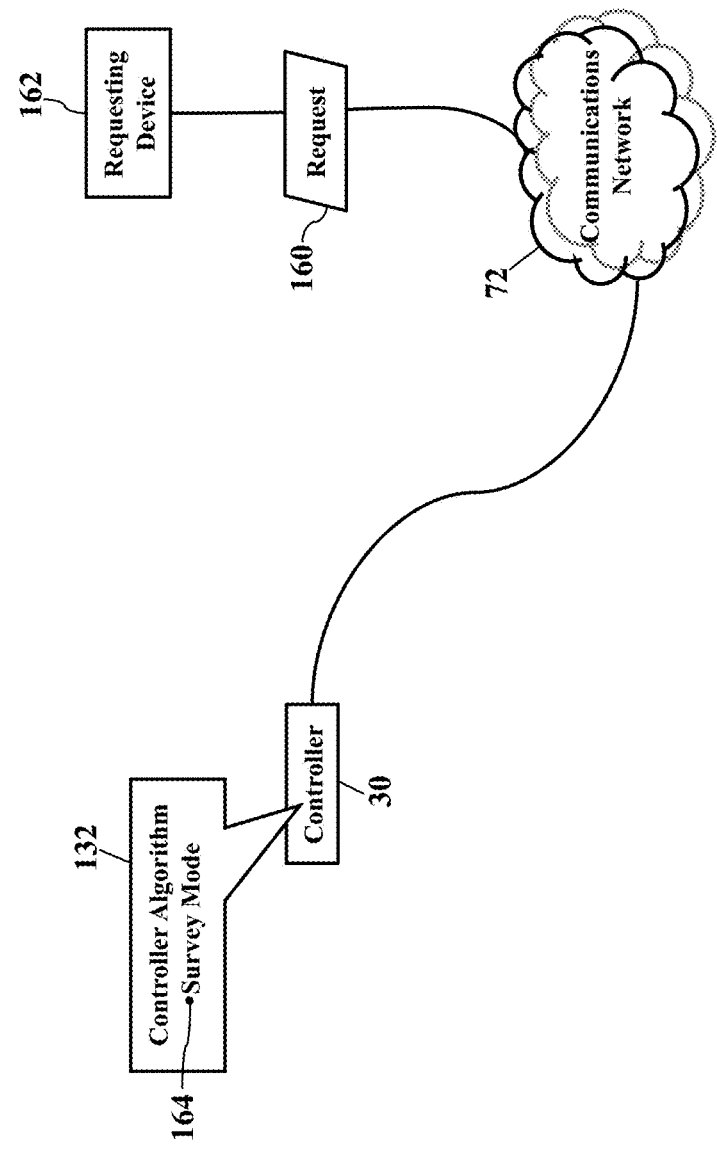
FIGS. 9-10 illustrate trigger mechanisms, according to exemplary embodiments.
Figure 10:
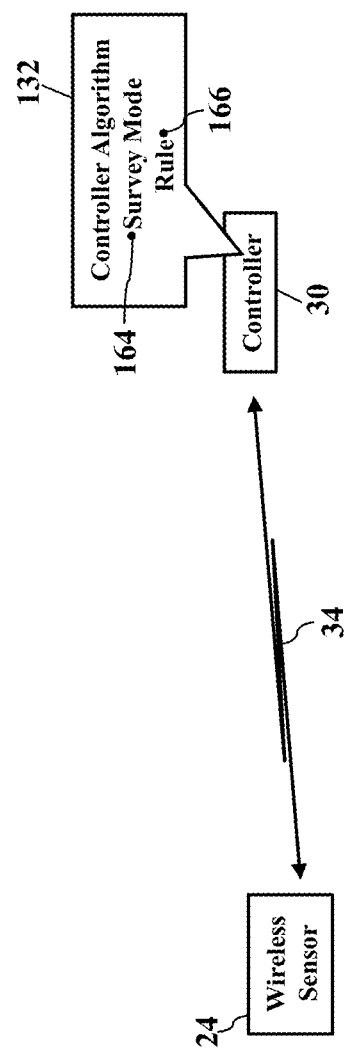

FIGS. 9-10 illustrate trigger mechanisms, according to exemplary embodiments. The radio survey service 74 may be invoked or triggered by different situations. FIG. 9, for example, illustrates an electronic request 160 originating from some requesting device 162. The requesting device 162 may be a computer or mobile device operated by a service technician, customer care personnel, a user/owner of the security system 20, or a subscriber to a security service. The requesting device 162 may alternatively be a server that executes some monitoring script for network performance data. Regardless, the requesting device 162 sends the electronic request 160 via the communications network 72 to the network address associated with the controller 30. When the controller 30 receives the electronic request 160, the controller algorithm 132 causes the controller 30 to enter a survey mode 164 of operation. FIG. 10, though, illustrates automatic triggering. Here the controller 30 itself may initiate the survey mode 164 of operation according to one or more logical rules 166. Each rule 166 defines a logical statement that triggers the survey mode 164 of operation. For example, the rule 166 may be executed in response to various performance criteria. If the controller algorithm 132 determines congestion exists in the wireless network 34, the rule 166 may require the survey mode 164 of operation. If the wireless sensor 24 fails to respond to a message, the rule 166 may require the survey mode 164 of operation. The rule 166 may even specify a timing parameter at which the survey mode 164 of operation is entered. For example, the survey mode 164 of operation may be initiated based on periodic time or calendar, such as weekly, daily, or even hourly.

Figure 11:
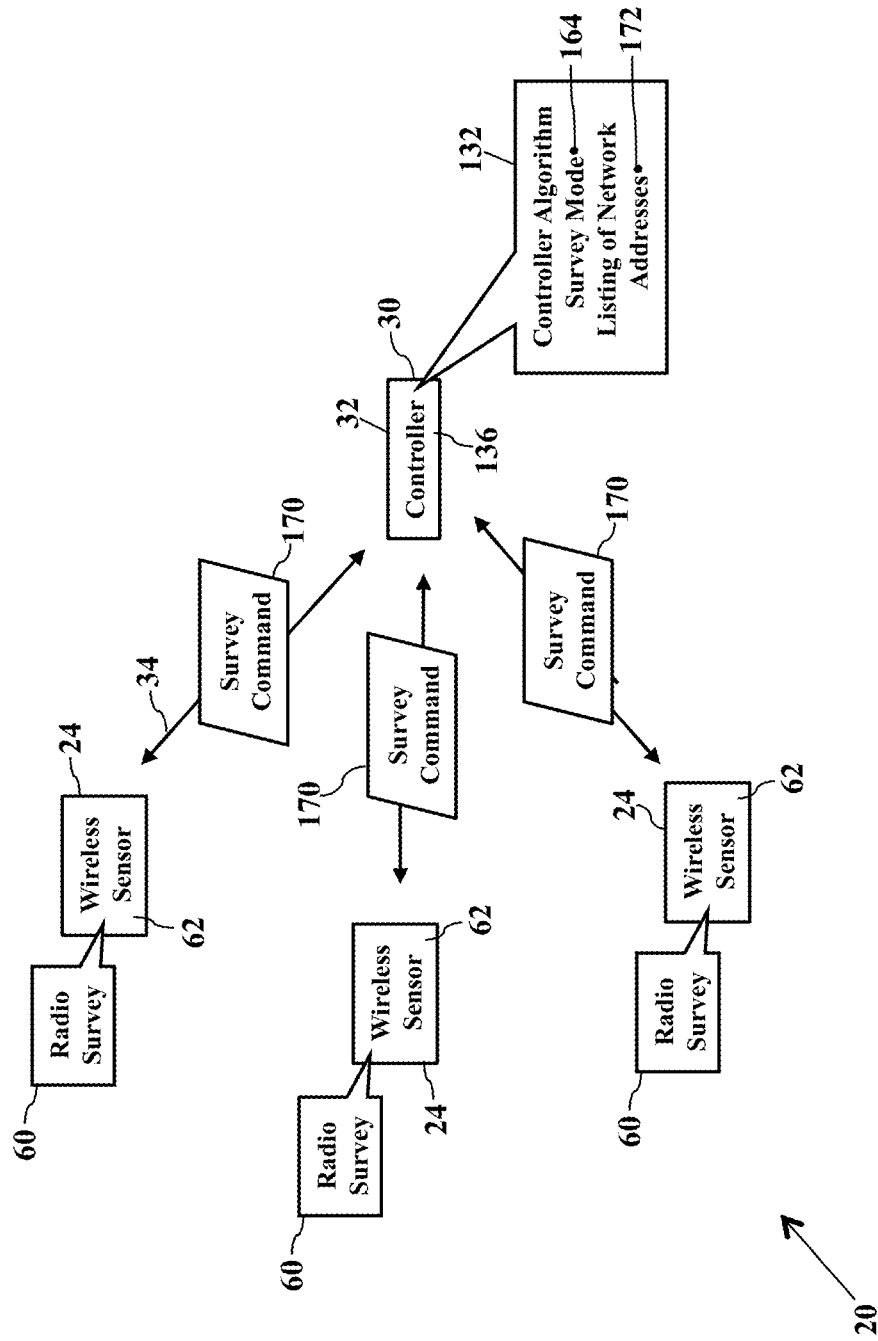
FIG. 11 illustrates survey commands, according to exemplary embodiments.

FIG. 11 illustrates survey commands 170, according to exemplary embodiments. However the survey mode 164 of operation is triggered, the controller 30 sends the survey commands 170 to any wireless devices accessing the wireless network 34. The controller algorithm 132, for example, causes the controller 30 to retrieve an electronic listing 172 of network addresses associated with the wireless sensors 24 of the security system 20. Each entry in the listing 172 of network addresses may include a unique subnet mask assigned to each different wireless sensor 24. The controller 30 then sends the survey command 170 to each unique network address associated with each different wireless sensor 24. The survey commands 170 are broadcast into the wireless network 34 created by the controller's transceiver 136, acting as the access device 32. Each survey command 170 instructs the respective wireless sensor 24 to perform the radio survey 60.

Figure 12:
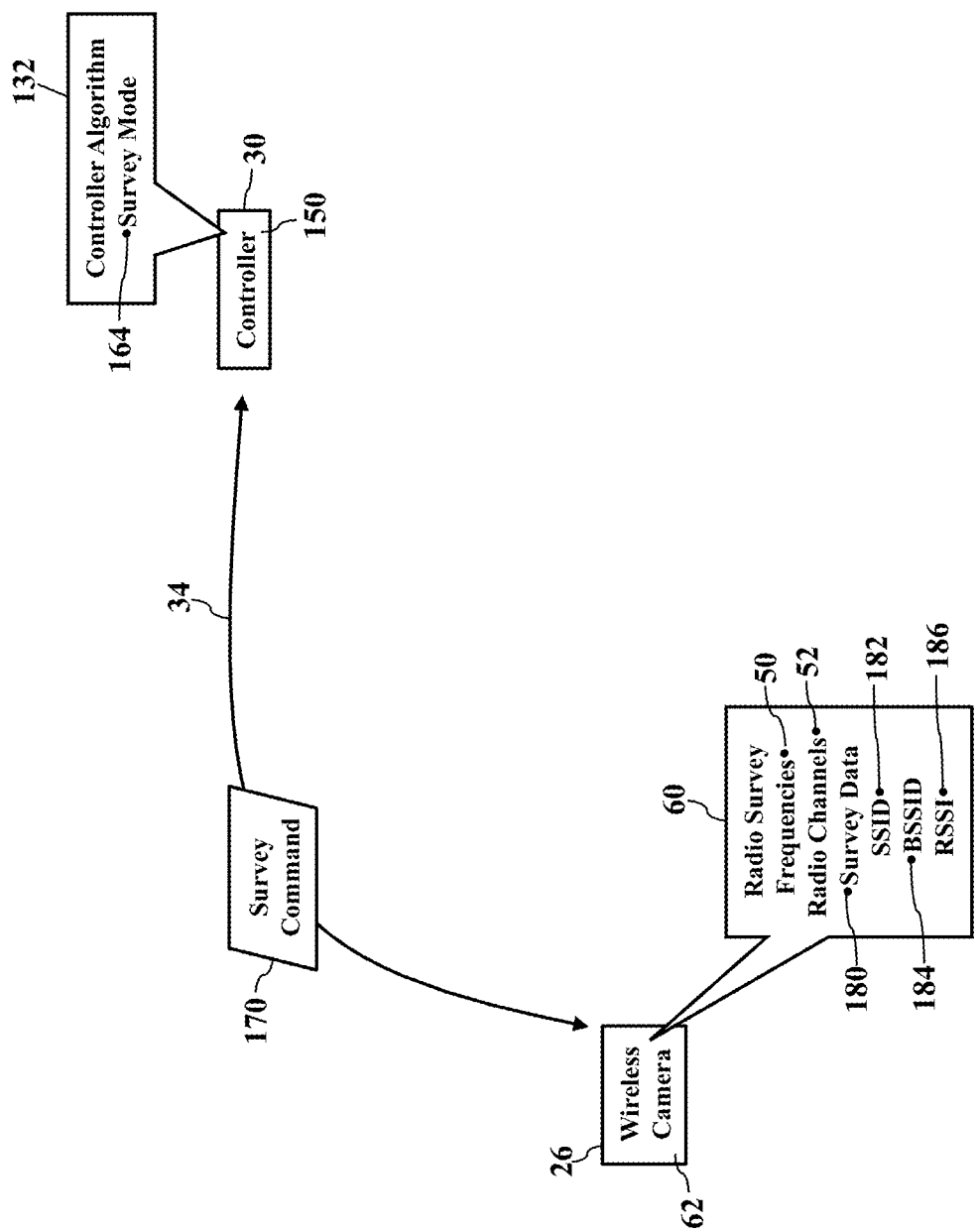
FIGS. 12-15 illustrate a radio survey, according to exemplary embodiments.

FIGS. 12-15 illustrate the radio survey 60, according to exemplary embodiments. FIG. 12, for simplicity, only illustrates the wireless camera 26 conducting the radio survey 60. Other wireless devices registered with the wireless network 34 may generally perform the same radio survey 60. When the wireless camera 26 receives the survey command 170, the sensory algorithm 142 collects survey data 180. The transceiver 62 operating in the wireless camera 26 scans the frequencies 50 for which results are desired. Again, even though exemplary embodiments may be applied to any frequencies in the electromagnetic spectrum, this disclosure will mainly discuss the frequencies reserved for wireless local area networking (or "WI-FI®").

Exemplary embodiments thus scan the WI-FI® radio channels 52. The radio channels 52 reserved for WI-FI® service are well known and thus need not be explained in detail. Suffice it to say that the IEEE 802.11 family of protocols reserves fourteen (14) radio channels 52 within a range of the frequencies 50 around 2.4 GHz (e.g., 2400-2500 MHz). The IEEE 802.11 family of protocols also reserves another twenty three (23) radio channels around 5 GHz (e.g., 5000-5800 GHz). The transceiver 62 operating in the wireless camera 26 thus scans these radio channels 52 and the sensory algorithm 142 collects the survey data 180. For example, the sensory algorithm 142 determines a service set identifier (or "SSID") 182 and a basic service set identifier (or "BSSID") 184 associated with an access point providing each different WI-FI® network. The SSID 182 and the BSSID 184 are well known identifying information for wireless local area networks, so no detailed explanation is needed. The sensory algorithm 142 may also determine the different radio channels 52 currently being used and a received signal strength indicator (or "RSSI") 186. As the reader is likely familiar with the bar graph indication of signal strength on the home screen of smartphones, no detailed explanation is needed.

Figure 13:
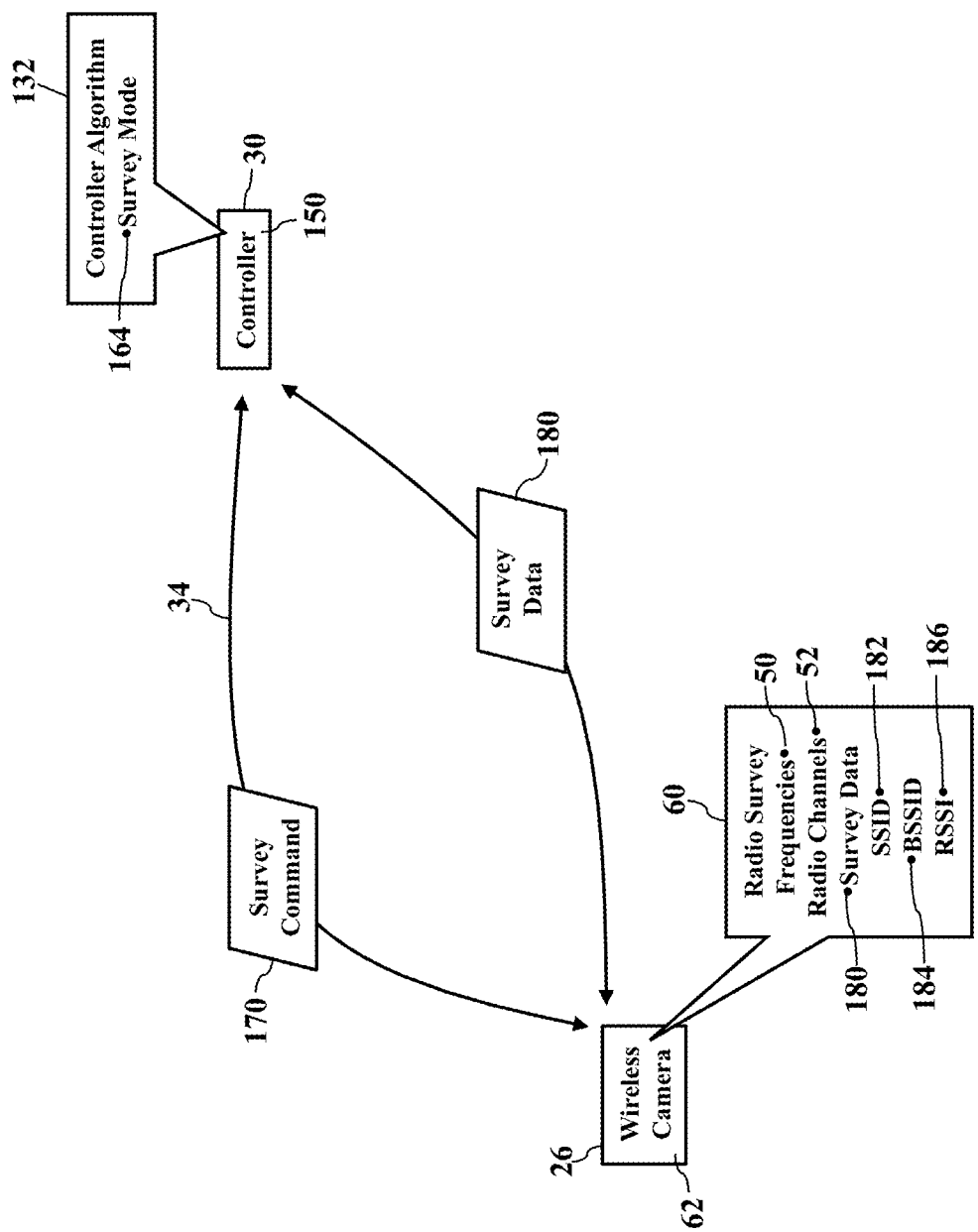

FIG. 13 illustrates a response mechanism. Once the sensory algorithm 142 collects the survey data 180, the sensory algorithm 142 may cause the wireless camera 26 (using its transceiver 62) to send the survey data 180 back to the controller 30. The survey data 180 may thus be sent into the wireless network 34 and addressed to the network address 150 uniquely associated with the controller 30.

Figure 14:
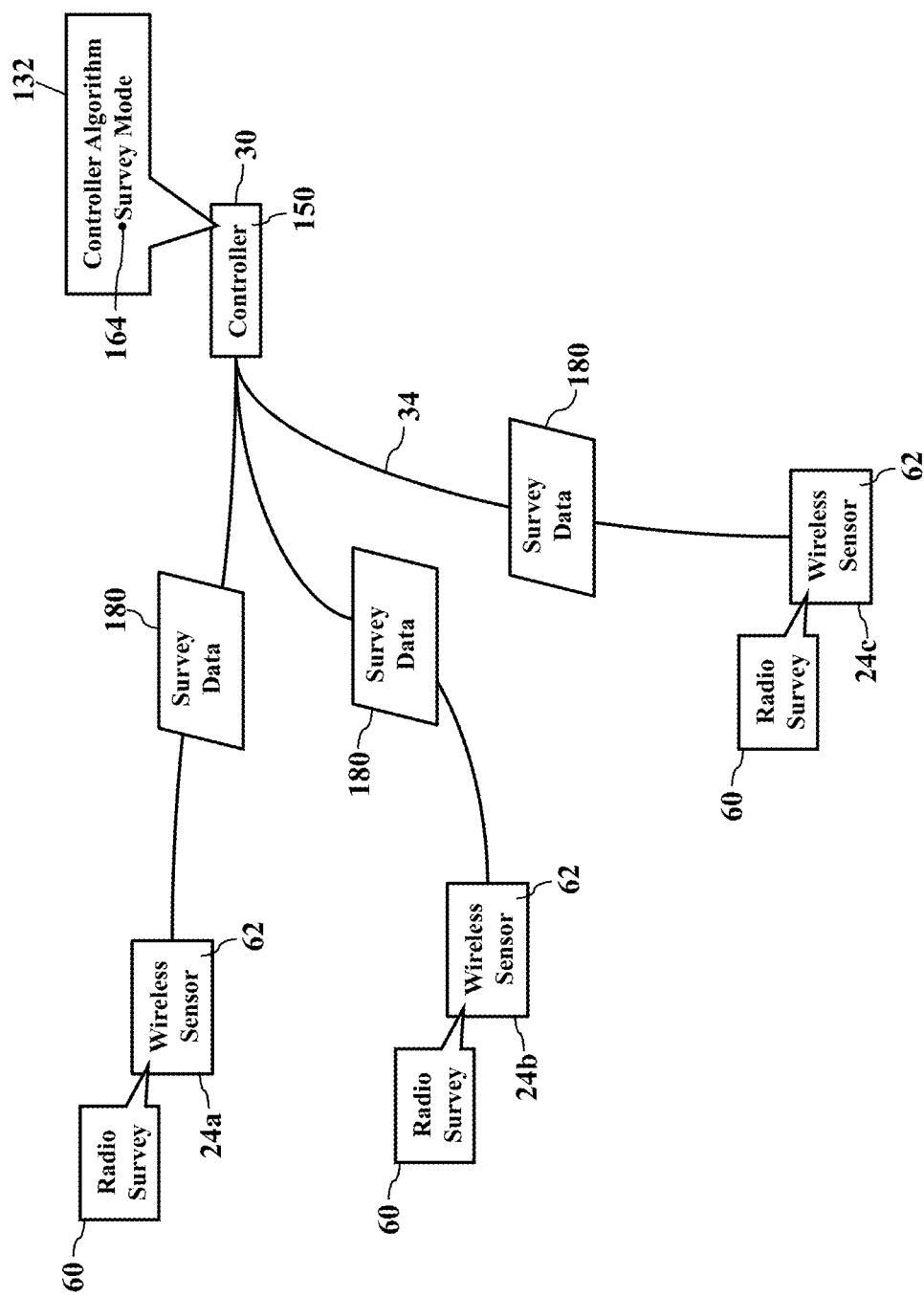

FIG. 14 illustrates network-wide responses. Recall that the controller 30 may have sent the survey command 170 to each different wireless sensor 24. All the wireless sensors 24 may thus generate and send their respective survey data 180 to the network address 150 associated with the controller 30. FIG. 14 thus illustrates the controller 30 receiving different survey data 180 generated by the multiple wireless sensors (24a, 24b, and 24c) located at different geographical positions served by the wireless network 34. Each one of the radio surveys 60 may be identified by, or associated with, the unique network address assigned to the corresponding wireless sensor 24.

Figure 15:
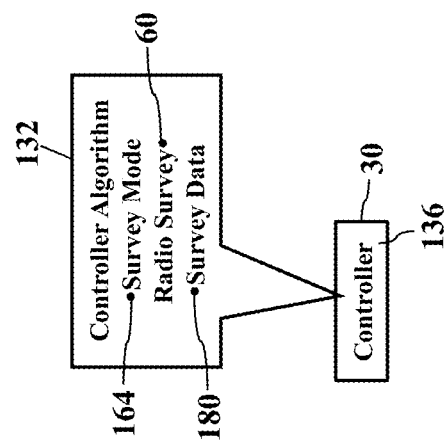

FIG. 15 illustrates a controller survey. The controller 30 of the security system 20 may also conduct its own radio survey 60. When the controller 30 enters the survey mode 164 of operation, the controller algorithm 132 may instruct the transceiver 62 to scan the WI-FI® radio channels 52. The controller algorithm 132 thus generates its own survey data 180 representing the radio characteristics at the installed location of the controller 30. As the controller 30 is usually installed in a closet or basement, its radio characteristics may greatly differ from those at the installed locations of the wireless sensors 24. The radio survey 60 generated by the controller 30 may likewise be associated with its unique network address.

Figure 16:
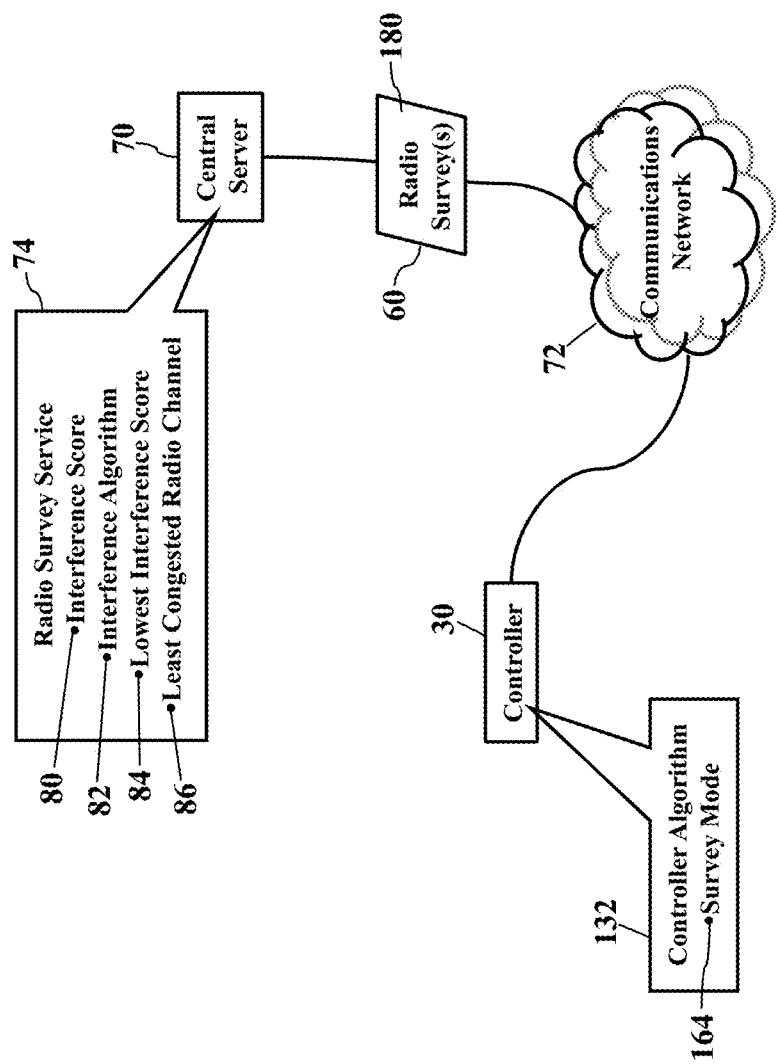
FIG. 16 illustrates remote service processing, according to exemplary embodiments.

FIG. 16 illustrates remote service processing, according to exemplary embodiments. Once the controller 30 collects the different survey data 180 reported by the different wireless sensors 24, the controller 30 may send the radio surveys 60 (e.g., the survey data 180) to the central server 70 for analysis. For example, the controller algorithm 132 may group or package the multiple radio surveys 60 into a single merged survey report. The single merged survey report may then be sent to the network address associated with the central server 70. However, the controller algorithm 132 may alternatively separately send the multiple radio surveys 60 to the network address associated with the central server 70. Regardless, the central server 70 collects the multiple real time radio surveys 60 commonly associated with the controller 30 of the security system 20. The central server 70 reads the survey data 180 associated with each radio survey 60. The central server 70 executes the interference algorithm 82 and determines the interference score 80 for each radio channel 52, using the survey data 180 reported by each wireless sensor 24. Each interference score 80 has a numeric value within a range of values. For simplicity, assume the interference scores 80 lie in the range of 0-100. The interference algorithm 82 compares all the different interference scores 80 and selects the lowest interference score 84 having the lowest numeric value. The lowest interference score 84 corresponds to the least congested radio channel 86 that is commonly available to the controller 30 and to all the wireless sensors 24.

Figure 17:
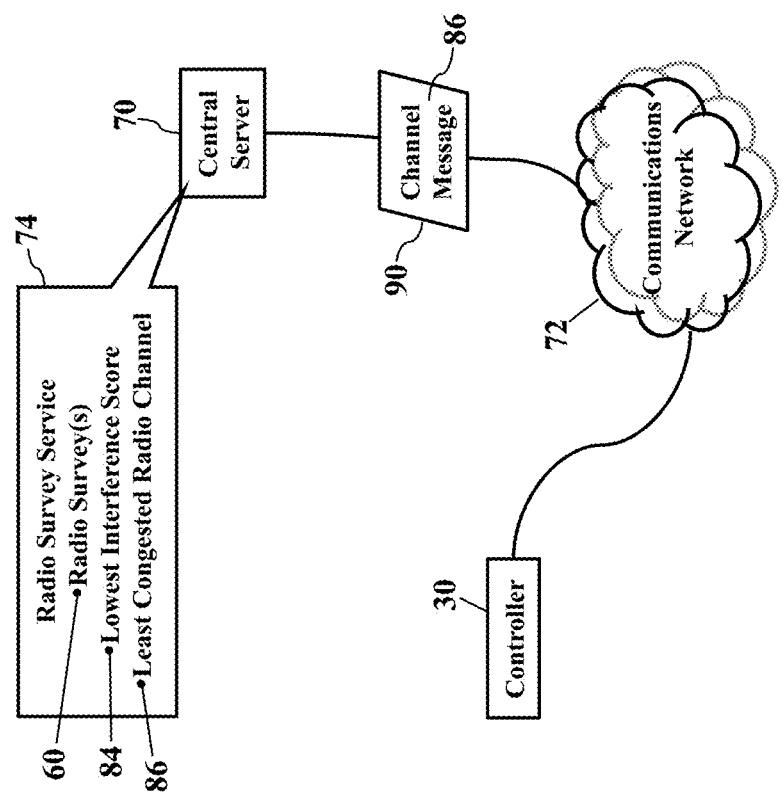
FIG. 17 illustrates a processing response, according to exemplary embodiments.

FIG. 17 illustrates a processing response, according to exemplary embodiments. Once the central server 70 determines the least congested radio channel 86, the central server 70 informs the controller 30 of the security system 20. The interference algorithm 82 causes the central server 70 to generate and send the electronic channel message 90 via the communications network 72 to the network address associated with the controller 30. The electronic channel message 90 contains or includes information or data describing the least congested radio channel 86, based on the radio surveys 60 previously submitted by the controller 30. The central server 70 has thus generated an internetwork solution for the best radio channel 86. That is, the central server 70 determines the least congested radio channel 86 without accessing the wireless network 34.

Figure 18:
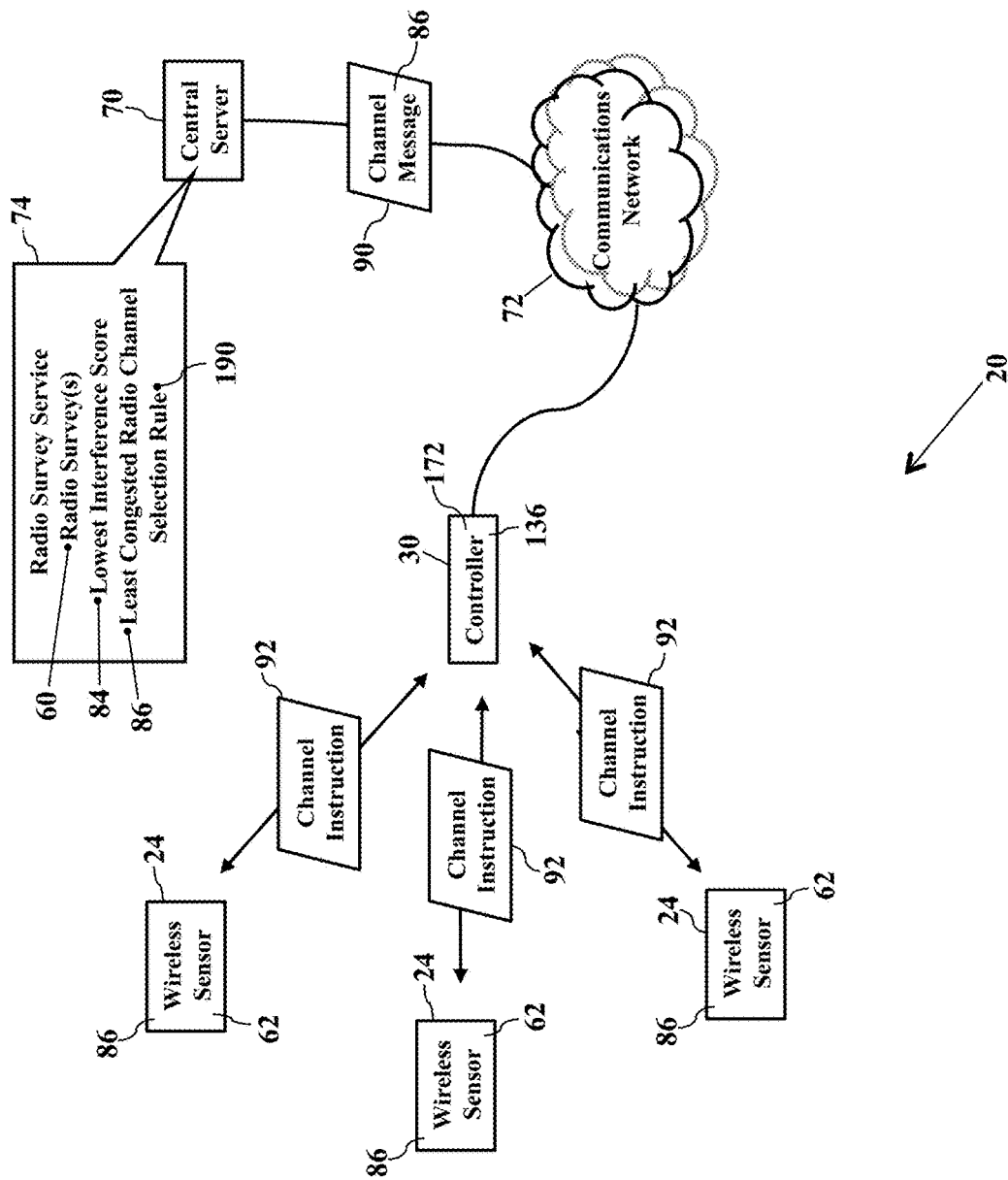
FIG. 18 illustrates channel selection, according to exemplary embodiments.

FIG. 18 illustrates channel selection, according to exemplary embodiments. When the controller 30 receives the electronic channel message 90, the controller algorithm 132 causes the controller 30 to generate the "WI-FI®" channel instruction 92, which the transceiver 136 broadcasts into the wireless network 34 to each one of the wireless sensors 24

(according to the listing 172 of network addresses). The "WI-FI®" channel instruction 92 instructs the transceiver 62 in each wireless sensor 24 to switch to the least congested radio channel 86.

The interference algorithm 82 is now explained in greater detail. The interference algorithm 82 is below explained using the frequencies 50 and radio channels 52 in the 2.4 GHz band. Exemplary embodiments, though, may be easily adapted to the newer 5 GHz spectrum.

The interference algorithm 82 may first exclude same survey data 180. If any survey data 180 contains the BSSID 184 associated with the controller 30 of the security system 20, any entries containing the BSSID 184 and the related survey data 180 may be excluded from evaluation. Recall that exemplary embodiments determine the least congested radio channel 86 compared to other neighboring access points providing the neighboring network 44 (as FIG. 1 illustrated). The neighboring network 44 may interfere with some channels of the wireless network 34 provided by the controller 30, thus degrading the performance of the security system 20. Moreover, if a BSSID 184, not associated with the controller 30, is discovered or seen by multiple ones of the wireless sensors 24, the interference algorithm 82 may select the survey data 180 representing the strongest signal (e.g., the greatest RSSI 186) for continued evaluation.

The interference algorithm 82 may now calculate the interference scores 80. The 2.4 GHz wireless spectrum features the eleven (11) radio channels 52. Channel 1 operates at a center frequency of 2.412 GHz and channel 11 operates at 2.462 GHz. The other channels 2-10 operate at the frequencies in between, evenly spaced at 5 MHz (0.005 GHz) intervals. As each radio channel 52 requires a signaling band roughly 22 MHz wide, the radio frequencies on neighboring channels significantly overlap with each other. The interference algorithm 82 may thus calculate the interference score 80 for each radio channel k, based on the following formula:

$$\text{Number of BSSID with RSSI>CS\_TH in channel } m$$
$$\text{for } (k-3 \le m \le k+3),$$

where "CS_TH" is the carrier sensing threshold specified by device vender. For example, the CS_TH may be (−85 dBm), which is a typical carrier-sensing threshold for IEEE 802.11 (g). The RSSI 186 may need to be adjusted according to their adjacency to channel k, such as:

$$\text{RSSI}=[(\text{RSSI measured})-1.25], \text{ for channels } k-1 \text{ and } k+1;$$

$$\text{RSSI}=[(\text{RSSI measured})-3.0], \text{ for channels } k-2 \text{ and } k+2; \text{ and}$$

$$\text{RSSI}=[(\text{RSSI measured})-6.0], \text{ for channels } k-3 \text{ and } k+3.$$

The radio channel 52 with lowest interference score 84 is least congested. The interference algorithm 82 may thus advise the controller 30 to select the least congested radio channel 86 for reliable security services.

The interference algorithm 82 may also include a tiebreaker mechanism. The above analysis may result in multiple radio channels 52 having the same lowest interference score 84. If the interference algorithm 82 determines multiple interference scores 80 having an equal, minimum numeric value, the interference algorithm 82 may retrieve and execute a selection rule 190 that reduces the number of least congested radio channels 52. The selection rule 166, in other words, breaks the tie. For example:

If channel 1 is one of the least congested channels, then choose channel 1; else, if channel 11 is one of the least congested channels, then choose channel 11; and else, if channel 6 is one of the least congested channels, then choose channel 6.

The interference algorithm 82 may thus recognize that channels 1, 6, and 11 never overlap. The interference algorithm 82 may thus prefer channels 1, 6, or 11 in tiebreaker situations.

FIGS. 19-22 are illustrations of the data package 100, according to exemplary embodiments. Once the interference algorithm 82 completes the evaluation of the least congested radio channel 52, the interference algorithm 82 may further generate the data package 100. The data package 100 may include details of the survey analysis, such as the raw data and each individual interference score 80. The central server 70 generates the data package 100, which may be sent to any network destination (as explained with reference to FIG. 6).

FIGS. 19-22 thus illustrate visualizations of the survey data 180. FIG. 19, for example, illustrates the raw survey data 180 presented as an electronic table. Each wireless sensor 24 may be associated with a textual description 200, perhaps based on its unique network address, such as a media access control ("MAC") address. The survey data 180 may further include the SSID 182 and the BSSID 184 identifying each different wireless network observed during the survey. Each wireless sensor 24 may also report the radio channels 52 in use at its installed location, along with the RSSI 186 measured for each radio channel 52. A timestamp 202 may also be added to each entry. The raw survey data 180 may thus have electronic database associations between different textual descriptions 200 of different wireless sensors and different SSIDs 182, BSSIDs 184, radio channels 52, RSSIs 186, and timestamps 202.

FIG. 20 illustrates the exclusions. Some of the survey data 180 may be filtered or removed. For example, notice BSSID "F4:5F:D4:79:A3:3F" (corresponding to SSID "ATT-66F") identifies the controller 30, so exemplary embodiments may filter these entries. Likewise, the survey data 180 also contains duplicate entries for BSSID "94:C1:50:06:BE:36", "00:40:96:53:71:0F" and "A0:B7:90:88:32:3F" (corresponding to SSIDs "ATT-30K", "Terrell-Access" and "2WIRE367"), thus these entries may be filtered out. Exemplary embodiments, however, may keep or retain the duplicate BSSID entry representing the strongest signal (e.g., the RSSI 186).

Figure 21:
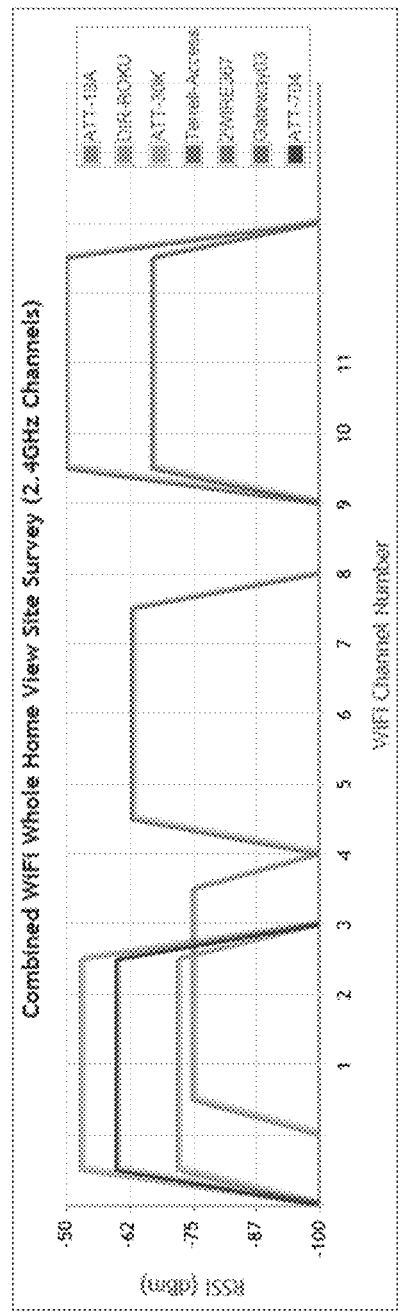
Figure 22:
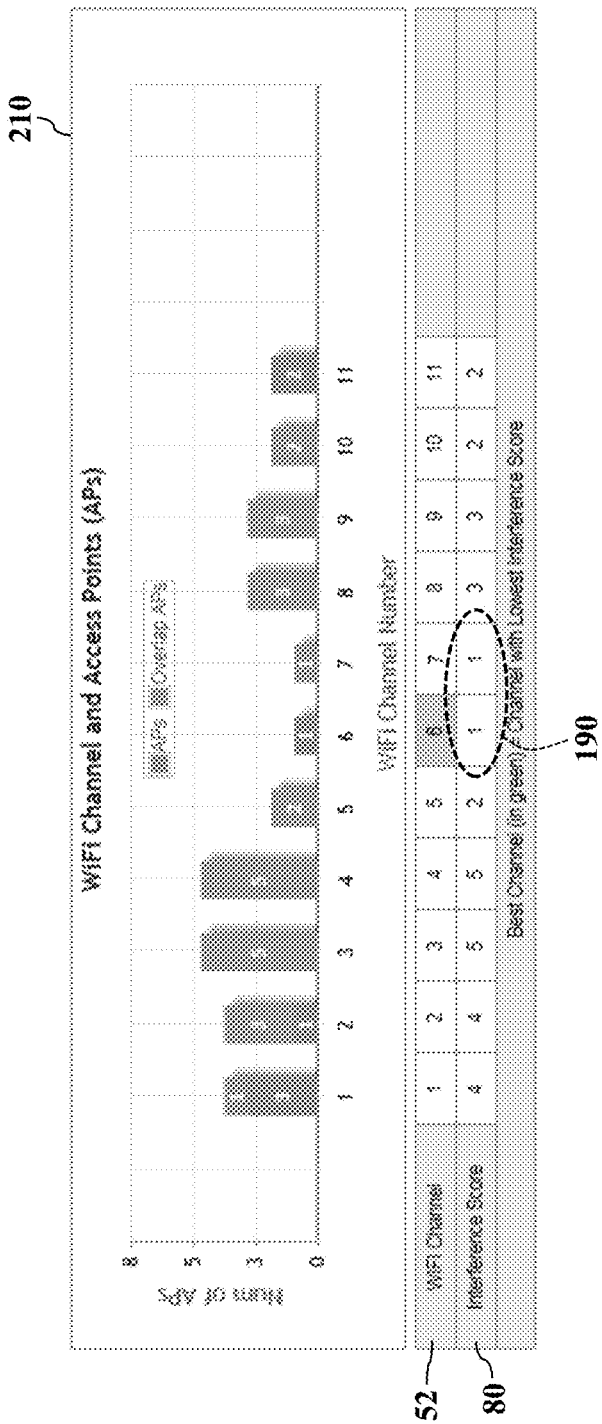

FIGS. 21-22 illustrate graphical user interfaces. FIG. 21, for example, is a graph of a combined WI-FI® channel whole home view survey illustrating the RSSI 186 for each radio channel 52 broadcast by each SSID 182 (after the exclusions, as above explained). Notice that "Gateway03" has the strongest RSSI on channel "11" and overlapping channel "10," while "ATT-30K" has a strong RSSI at channel "1" and overlapping channel "2." Access point "2WIRE367" has a strong RSSI on channels "5," "6," and "7."

FIG. 22 illustrates an interference score table 210. The raw survey data 180 may be plotted for easy visualization of congestion and signal strength. The interference score table 210 displays the interference score 80 associated with each different radio channel 52. The interference score table 210 also presents the number of access points using each radio channel 52 and the number of access points that overlap with that radio channel 52. When the reader inspects FIG. 22, the reader sees that channel "6" is only used by a single access point, and channel "7" is only used as an overlap of either channel "6" or "8." Channels "6" and "7," in other words, tie for the lowest interference score 84.

FIG. 22 also illustrates the tie-breaker mechanism. Because channels "6" and "7" have the lowest interference score 84, exemplary embodiments may break the tie. Exemplary embodiments retrieve and execute the selection rule 190 that reduces the number of least congested radio channels 52. The selection rule 190, in other words, breaks the tie. Recall the selection rule 190:

If channel 1 is one of the least congested channels, then choose channel 1; else, if channel 11 is one of the least congested channels, then choose channel 11; and else, if channel 6 is one of the least congested channels, then choose channel 6.

Because channels "6" and "7" have the lowest interference score 84, the selection rule 190 chooses channel "6" for the final determination of the least congested radio channel 86.

Figure 23:
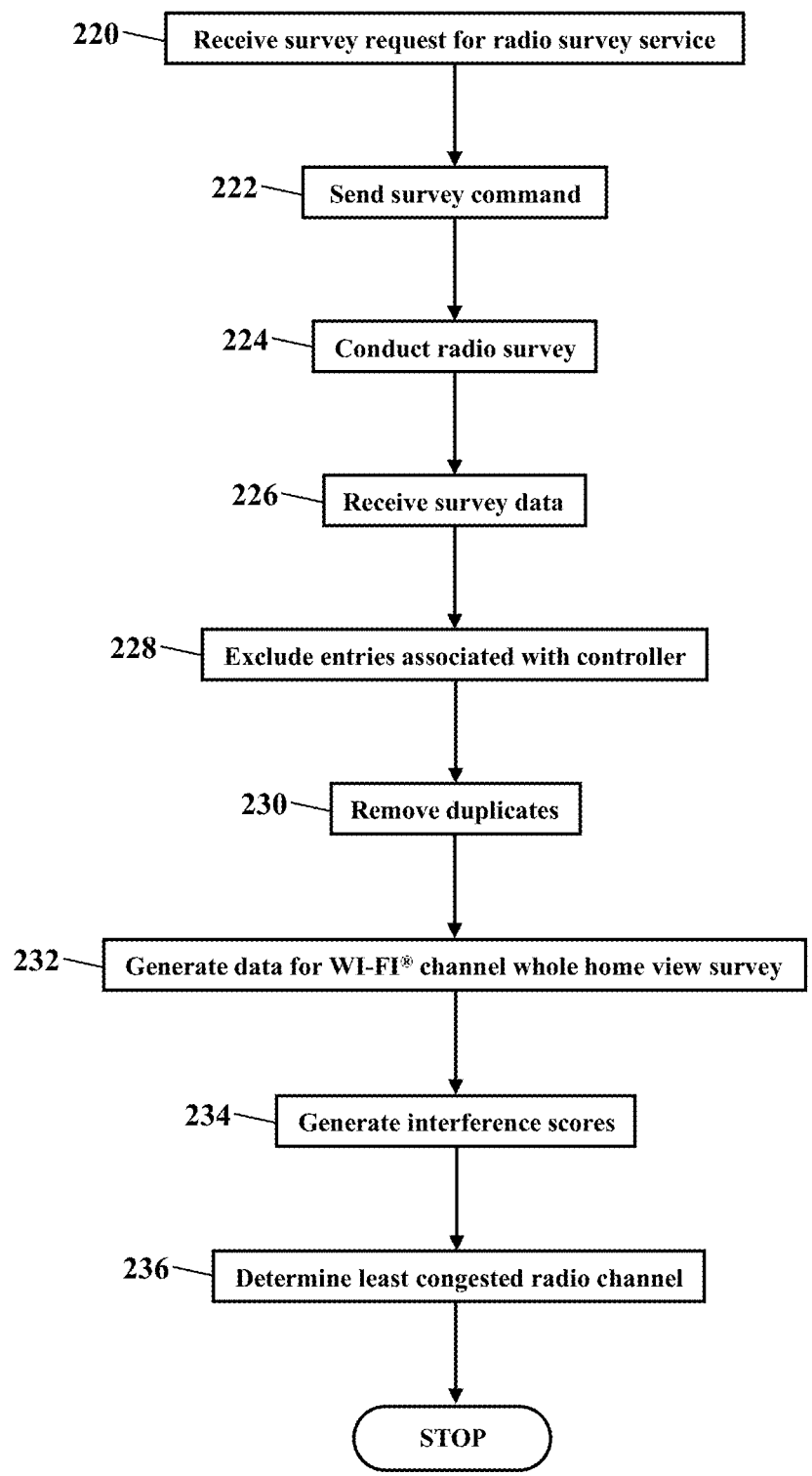
FIG. 23 is a flowchart illustrating a method or algorithm for channel selection, according to exemplary embodiments.

FIG. 23 is a flowchart illustrating a method or algorithm for channel selection, according to exemplary embodiments. The central server 70 receives an electronic survey request for the radio survey service 74 (Block 220). The electronic survey request may include information or data specifying a unique identifier of the controller 30 and/or each wireless device communicating with the controller. The central server 70 sends an HTTP request (such as the survey command 170) to the controller 70 and/or each wireless device (Block 222). The HTTP request triggers each wireless device to conduct the radio survey 60 (Block 224). The survey data 180 is received as an HTTP response (Block 226). Entries associated with the BSSID of the controller are excluded (Block 228). Any duplicate BSSID entries are removed (Block 230). The data describing the combined WI-FI® channel whole home view survey is generated (Block 232). The interference scores 80 are generated (Block 234) and the least congested radio channel 86 is determined (Block 236).

Figure 24:
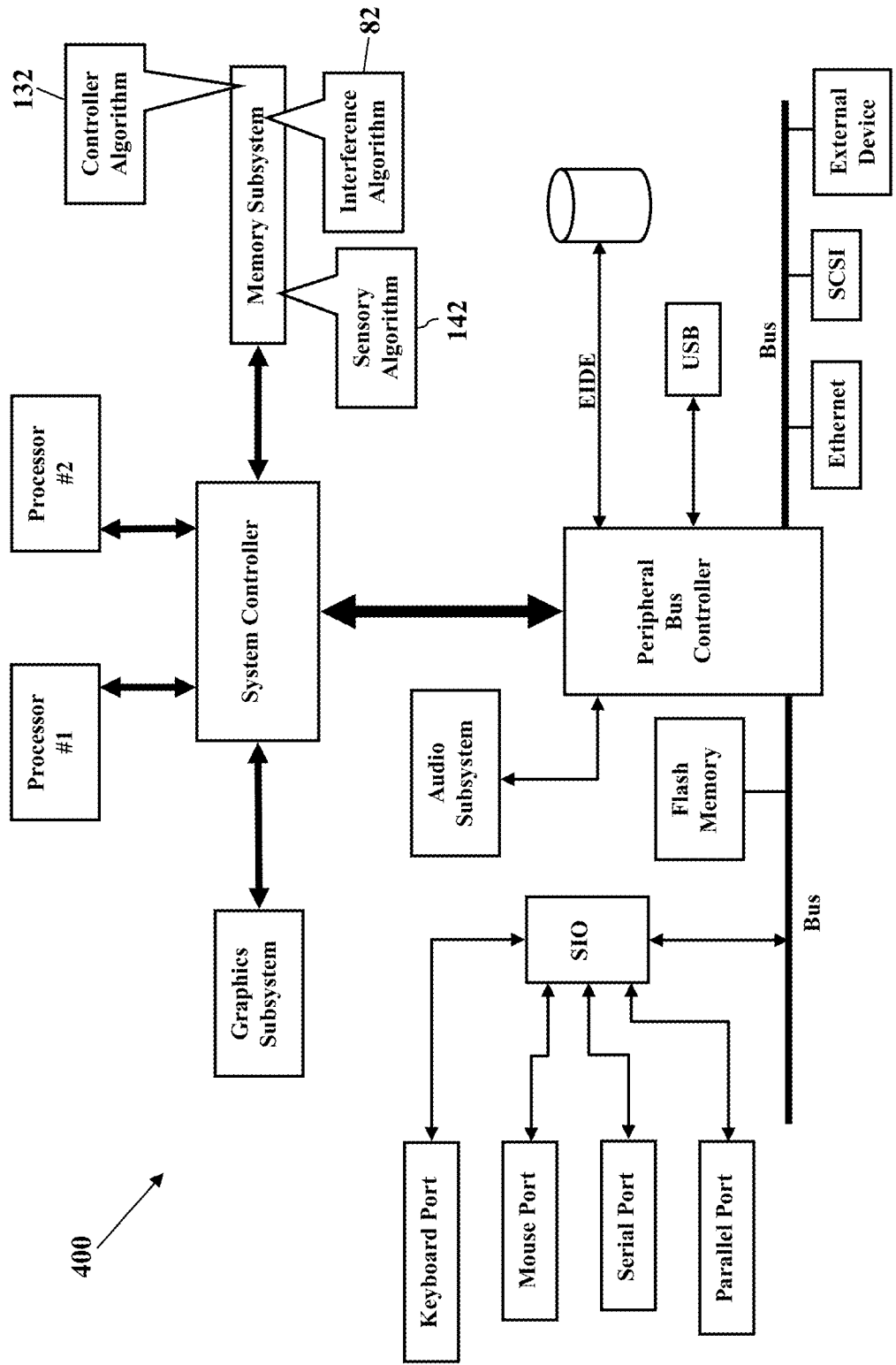
FIGS. 24-25 depict still more operating environments for additional aspects of the exemplary embodiments.

FIG. 24 is a schematic illustrating still more exemplary embodiments. FIG. 24 is a more detailed diagram illustrating a processor-controlled device 400. As earlier paragraphs explained, the interference algorithm 82, the controller algorithm 132, and/or the sensory algorithm 142 may partially or entirely operate in any mobile or stationary processor-controlled device. FIG. 24, then, illustrates the interference algorithm 82, the controller algorithm 132, and/or the sensory algorithm 142 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 25:
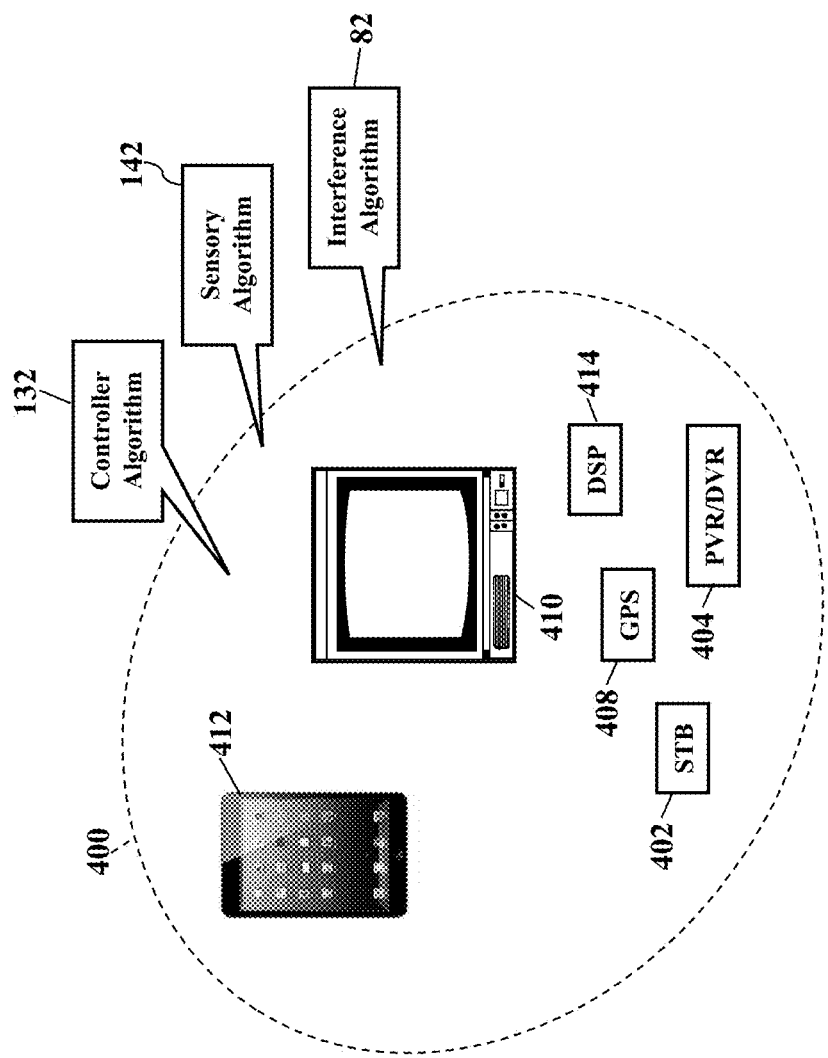

FIG. 25 depicts other possible operating environments for additional aspects of the exemplary embodiments. FIG. 25 illustrates the interference algorithm 82, the controller algorithm 132, and/or the sensory algorithm 142 operating within various other processor-controlled devices 400. FIG. 25, for example, illustrates that the interference algorithm 82, the controller algorithm 132, and/or the sensory algorithm 142 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing any of the processors above described and/or a digital signal processor (DP/DSP) 414. Moreover, the processor-controlled device 400 may also include wearable devices (such as watches), radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for selecting radio channels, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method of resolving an interference in a wireless local area network, comprising:
   receiving, by a server, a radio channel request from a wireless device requesting a radio channel selection service;
   retrieving, by the server, a radio survey of the wireless local area network, wherein a plurality of wireless sensors in the wireless local area network each provides data for the radio survey responsive to a survey command;
   determining, by the server, multiple interference scores associated with radio channels reserved for the wireless local area network, each one of the multiple interference scores corresponding to a different radio channel of the radio channels reserved for the wireless local area network, wherein the multiple interference scores are determined by counting a number of basic service set identifiers having a received signal strength indicator exceeding a threshold value in the different radio channel;
   selecting, by the server, a selected radio channel that corresponds to a lowest value of the multiple interference scores across the wireless local area network; and
   sending, by the server, a radio channel message to the wireless device as a service response to the radio channel selection service, the radio channel message specifying the selected radio channel that corresponds to the lowest value of the multiple interference scores to resolve the interference in the wireless local area network.

2. The method of claim 1, wherein the received signal strength indicator is reduced depending upon an adjacency of an operating channel of a device matching a basic service set identifier and the different radio channel for which an interference score is being determined.

3. The method of claim 1, further comprising determining a radio frequency associated with the selected radio channel.

4. The method of claim 1, further comprising wirelessly receiving electromagnetic frequencies during the radio survey.

5. The method of claim 1, wherein the threshold value is −85 dBm.

6. The method of claim 1, wherein the selecting chooses channels in a predetermined order when more than one radio channel corresponds to the lowest value of the multiple interference scores across the wireless local area network.

7. A system for resolving radio interference, comprising:
a hardware processor; and
a memory device, the memory device storing instructions, wherein the instructions when executed cause the hardware processor to perform operations, the operations comprising:
receiving a radio channel request from a security system, the radio channel request requesting a radio channel selection service to resolve the interference in a wireless local area network;
retrieving a radio survey of the wireless local area network from the security system, wherein a plurality of wireless sensors in the wireless local area network each provides data for the radio survey responsive to a survey command;
determining multiple interference scores associated with radio channels reserved for the wireless local area network, each one of the multiple interference scores corresponding to a different radio channel of the radio channels reserved for the wireless local area network, wherein the multiple interference scores are determined by counting a number of basic service set identifiers having a received signal strength indicator exceeding a threshold value in the different radio channel;
selecting a radio channel that corresponds to a lowest value of the multiple interference scores associated with the radio channels reserved for the wireless local area network; and
sending a radio channel message to the security system, the radio channel message specifying the radio channel in response to the radio channel request for the radio channel selection service,
wherein the radio channel selection service selects the radio channel that resolves the interference in the wireless local area network.

8. The system of claim 7, wherein the operations further comprise comparing the multiple interference scores.

9. The system of claim 8, wherein the operations further comprise sending the radio survey.

10. The system of claim 7, wherein the operations further comprise determining a radio frequency associated with the radio channel.

11. The system of claim 7, wherein the operations further comprise wirelessly receiving electromagnetic frequencies during the radio survey.

12. The system of claim 7, wherein the operations further comprise wirelessly receiving radio frequencies during the radio survey.

13. The system of claim 7, wherein the operations further comprise wirelessly receiving radio frequencies reserved for the wireless local area network.

14. A memory device storing instructions that when executed cause a hardware processor to perform operations, the operations comprising:
receiving a radio channel request from a network gateway, the radio channel request requesting a radio channel selection service that resolves an interference in a wireless local area network;
retrieving a radio survey of the wireless local area network from the network gateway, wherein a plurality of wireless sensors in the wireless local area network each provides data for the radio survey responsive to a survey command;
determining multiple interference scores associated with radio channels reserved for the wireless local area network, each one of the multiple interference scores corresponding to a different radio channel of the radio channels reserved for the wireless local area network, wherein the multiple interference scores are determined by counting a number of basic service set identifiers having a received signal strength indicator exceeding a threshold value in the different radio channel;
selecting a preferred radio channel that corresponds to a lowest value of the multiple interference scores associated with the radio channels reserved for the wireless local area network; and
sending a radio channel message to the network gateway, the radio channel message specifying the preferred radio channel in response to the radio channel request for the radio channel selection service,
wherein the radio channel selection service selects the preferred radio channel to resolve the interference in the wireless local area network.

15. The memory device of claim 14, wherein the operations further comprise comparing the multiple interference scores.

16. The memory device of claim 15, wherein the operations further comprise sending the radio survey.

17. The memory device of claim 14, wherein the operations further comprise determining a radio frequency associated with the preferred radio channel.

18. The memory device of claim 14, wherein the operations further comprise wirelessly receiving electromagnetic frequencies during the radio survey.

19. The memory device of claim 14, wherein the operations further comprise wirelessly receiving radio frequencies during the radio survey.

20. The memory device of claim 14, wherein the threshold value is −85 dBm.

* * * * *